United States Patent
LeMay et al.

(10) Patent No.: US 9,501,637 B2
(45) Date of Patent: Nov. 22, 2016

(54) HARDWARE SHADOW STACK SUPPORT FOR LEGACY GUESTS

(71) Applicant: Intel Corporation, Santa Clara, CA (US)

(72) Inventors: Michael LeMay, Hillsboro, OR (US); Barry E. Huntley, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 22 days.

(21) Appl. No.: 14/498,075

(22) Filed: Sep. 26, 2014

(65) Prior Publication Data

US 2016/0092673 A1    Mar. 31, 2016

(51) Int. Cl.
*G06F 9/44*  (2006.01)
*G06F 9/45*  (2006.01)
*G06F 21/52*  (2013.01)
*G06F 9/455*  (2006.01)
*G06F 11/34*  (2006.01)

(52) U.S. Cl.
CPC ........... *G06F 21/52* (2013.01); *G06F 9/45533* (2013.01); *G06F 9/45558* (2013.01); *G06F 8/30* (2013.01); *G06F 8/31* (2013.01); *G06F 11/3419* (2013.01); *G06F 2009/45587* (2013.01)

(58) Field of Classification Search
CPC ............. G06F 8/30; G06F 8/31; G06F 8/443; G06F 9/4428; G06F 11/3419; G06F 9/45516; G06F 9/45504
See application file for complete search history.

(56) References Cited

U.S. PATENT DOCUMENTS

| | | | |
|---|---|---|---|
| 6,349,383 B1* | 2/2002 | Col .................... | G06F 9/3004 712/202 |
| 7,581,089 B1* | 8/2009 | White .................. | G06F 9/4426 712/242 |
| 9,058,492 B1* | 6/2015 | Satish | |
| 9,250,937 B1* | 2/2016 | Franz ................. | G06F 9/45516 |
| 2009/0307431 A1* | 12/2009 | Garst, Jr. ............. | G06F 8/443 711/132 |
| 2012/0167120 A1* | 6/2012 | Hentunen ............ | G06F 21/54 719/320 |
| 2013/0117843 A1* | 5/2013 | Komaromy et al. .......... | 726/22 |
| 2014/0082327 A1* | 3/2014 | Ghose ................. | G06F 9/3877 712/205 |

(Continued)

OTHER PUBLICATIONS

Hart et al., "Hardware Assisted ROP Detection Mode (HARD Mode)", Aug. 2013, Academy Center for Cyberspace Research, pp. 1-10; <www.dtic.mil/get-tr-doc/pdf?AD=ADA591718>.*

(Continued)

*Primary Examiner* — Thuy Dao
*Assistant Examiner* — Ben C Wang
(74) *Attorney, Agent, or Firm* — Barnes & Thornburg LLP

(57) ABSTRACT

Technologies for shadow stack support for legacy guests include a computing device having a processor with shadow stack support. During execution of a call instruction, the processor determines whether a legacy stack pointer is within bounds and generates a virtual machine exit if the legacy stack pointer is out-of-bounds. If not out-of-bounds, the processor pushes a return address onto the legacy stack and onto a shadow stack protected by a hypervisor. During execution of a return instruction, the processor determines whether top return addresses of the legacy stack and the shadow stack match, and generates a virtual machine exit if the return addresses do not match. If the return addresses match, the processor pops the return addresses off of the legacy stack and off of the shadow stack. The stack out-of-bounds and the stack mismatch virtual machine exits may be handled by the hypervisor. Other embodiments are described and claimed.

21 Claims, 7 Drawing Sheets

(56) References Cited

U.S. PATENT DOCUMENTS

| | | | | |
|---|---|---|---|---|
| 2014/0096245 | A1* | 4/2014 | Fischer | 726/23 |
| 2014/0344932 | A1* | 11/2014 | Polychronakis et al. | 726/23 |
| 2014/0365742 | A1* | 12/2014 | Patel et al. | 711/163 |
| 2015/0095617 | A1* | 4/2015 | Shanbhogue et al. | 712/208 |
| 2015/0128266 | A1* | 5/2015 | Tosa | G06F 21/52 726/23 |
| 2015/0186296 | A1* | 7/2015 | Guidry | 726/23 |
| 2015/0215335 | A1* | 7/2015 | Giuliani | H04L 63/1441 726/23 |
| 2015/0256294 | A1* | 9/2015 | Kikugawa | H04L 1/0083 714/776 |
| 2015/0278516 | A1* | 10/2015 | Caprioli | 726/23 |
| 2015/0339480 | A1* | 11/2015 | Lutas et al. | 726/23 |
| 2016/0042177 | A1* | 2/2016 | Ben-Haim | G06F 21/54 726/22 |
| 2016/0092183 | A1* | 3/2016 | Radigan | G06F 8/4435 717/159 |
| 2016/0110542 | A1* | 4/2016 | Shanbhogue | G06F 21/54 726/23 |
| 2016/0170769 | A1* | 6/2016 | LeMay | G06F 9/3863 713/190 |

OTHER PUBLICATIONS

Jiang et al., "HyperCrop: A Hypervisor-Based Countermeasure for Return Oriented Programming", Springer-Verlag Berlin Heidelberg 2011, ICICS 2011, Beijing, China, Nov. 23-26, 2011, LNCS 7043, pp. 360-373; <http://link.springer.com/chapter/10.1007%2F978-3-642-25243-3_29#page-1>.*

Davi et al., "ROPdefender: A Detection Tool to Defined Against Return-Oriented Programming Attachks", 2011 ACM, ASIACCS'11, Mar. 22-24, 2011, Hong Kong, China, pp. 1-12; <http://dl.acm.org/citation.cfm?id=1966920&CFID=573936520&CFTOKEN=23836272>.*

Pappas et al., "Transparent ROP Exploit Mitigation Using Indirect Branch Tracing", Aug. 2013, 22nd USENIX Security Symposium, pp. 447-462; <https://www.usenix.org/conference/usenixsecurity13/technical-sessions/paper/pappas>.*

Chen et al., "Efficient Detection of the Return-Oriented Programming Malicious Code", Dec. 2010, Springer-Verlag Berlin Heidelberg, pp. 140-155; <http://link.springer.com/chapter/10.1007%2F978-3-642-17714-9_11#page-1>.*

Lu et al., "deRop—Removing Return-Oriented Programming from Malware", Dec. 2011, ACM, pp. 363-372; <http://dl.acm.org/citation.cfm?id=2076784&CFID=641048246&CFTOKEN=88268004>.*

Polychronakis et al., "ROP Payload Detection Using Speculative Code Execution", Oct. 2011, IEEE. pp. 58-65; <http://ieeexplore.ieee.org/stamp/stamp.jsp?tp=&arnumber=6112327>.*

* cited by examiner

HARDWARE SHADOW STACK SUPPORT FOR LEGACY GUESTS

BACKGROUND

Return-oriented programming (ROP) exploits are an increasingly common form of malicious software (malware) that may circumvent certain defenses that mark locations of memory as non-executable. An ROP exploit works by stringing together a large number of existing segments of executable code that each end with a "return" instruction (known as gadgets). Each ROP gadget is typically short, and typically does not correspond to an existing procedure or even an existing instruction boundary in the executable code. The attacker constructs a malicious stack including a series of return addresses pointing to the desired sequence of gadgets. The ROP exploit is performed by causing the processor of the computer to execute software using the malicious stack instead of the legitimate system stack. For example, the malicious stack may be introduced by smashing the stack, using a buffer overflow exploit, pivoting to a new stack, or otherwise corrupting the system stack.

Certain ROP exploits may be prevented by maintaining a "shadow stack" in parallel with the ordinary system stack (also called the "legacy stack"). The shadow stack maintains a copy of the legacy stack in memory inaccessible to ordinary software, and may be used to determine if the legacy stack has been tampered with by malware. The shadow stack may be implemented using binary instrumentation, which introduces a significant performance slowdown for some usages.

Other measures are available to help prevent ROP exploits. For example, "canary" values may be inserted near return addresses in the stack, and may be monitored for changes. As another example, "control transfer terminating instructions" may be inserted into binaries to specifically identify legitimate return targets. However such measures may require recompiling or otherwise modifying guest software. Additionally, certain processor architectures may provide a call stack that is inaccessible to certain software. For example, certain microcontrollers may maintain a call stack that is inaccessible to software. As another example, certain processor architectures may maintain call stack information in a separate memory region from other stack values such as automatic variables.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
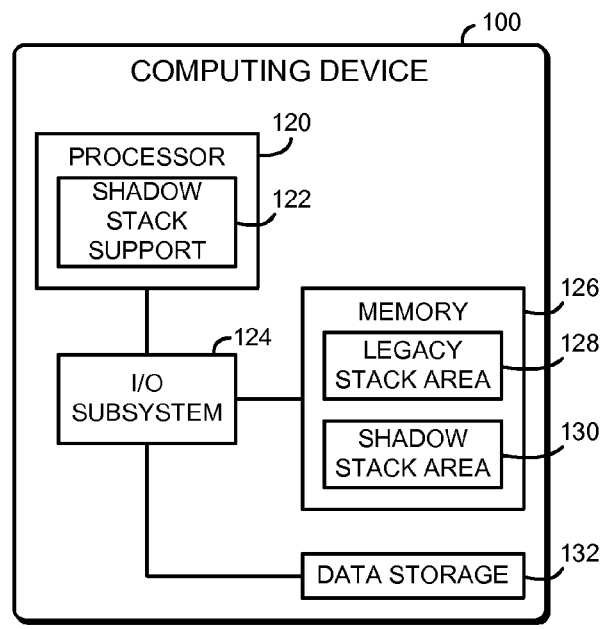
FIG. 1 is a simplified block diagram of at least one embodiment of a computing device for shadow stack support for legacy guests.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for shadow stack support for legacy guests includes a processor 120 having hardware shadow stack support. In use, as described below, the computing device 100 executes guest software such as guest operating system or guest application in a guest virtual machine. When executing a call instruction in the guest software, the processor 120 pushes the return address onto a legacy stack and onto a shadow stack. The shadow stack is maintained by a hypervisor and thus protected from direct access by the guest software. The processor 120 also determines whether the current stack pointer exceeds stack bounds that have been set by the hypervisor. If the stack bounds are exceeded, the processor 120 generates a virtual machine exit that may be handled by the hypervisor. The hypervisor may, for example, update stack record metadata associated with the legacy stack or the shadow stack, allocate additional shadow stack memory, or perform other operations. Additionally, while executing a return instruction in the guest software, the processor 120 determines whether the top return addresses of the legacy stack and shadow stack match, and if the return addresses do not match, the processor 120 generates a virtual machine exit that may be handled by the hypervisor. The hypervisor may, for example, apply one or more heuristic checks to determine whether the stack mismatch violation was caused by malicious software, and if so, perform one or more appropriate security operations.

By maintaining a shadow stack and monitoring stack activity, the computing device 100 may detect and/or prevent return-oriented programming (ROP) exploits. By using hardware support coupled with a hypervisor, the computing device 100 may perform stack monitoring with good performance and with support for legacy guest software (i.e. support for existing software without recompilation or other modification).

The computing device 100 may be embodied as any type of device capable of providing shadow stack support and otherwise performing the functions described herein. For example, the computing device 100 may be embodied as, without limitation, a computer, a desktop computer, a workstation, a server computer, a laptop computer, a notebook computer, a tablet computer, a smartphone, a mobile computing device, a wearable computing device, a distributed computing system, a multiprocessor system, a consumer electronic device, a smart appliance, and/or any other computing device capable of providing shadow stack support. As shown in FIG. 1, the illustrative computing device 100 includes the processor 120, an I/O subsystem 124, a memory 126, and a data storage device 132. Of course, the computing device 100 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. The processor 120 includes shadow stack support 122. The shadow stack support 122 may be embodied as any hardware, microcode, firmware, or other components of the processor 120 capable of maintaining a shadow stack, monitoring a legacy stack, and/or generating virtual machine exits. As further described below, the shadow stack support 122 may include processor instructions (e.g., a call instruction and a return instruction) that maintain the shadow stack and monitor the legacy stack. The shadow stack support 122 may also be capable of generating virtual machine exits in response to certain stack-related events, such as stack out-of-bounds events or stack return address mismatch events. The shadow stack support 122 may also be selectively enabled or disabled, for example by enabling a stack monitoring mode.

Similarly, the memory 126 may be embodied as any type of volatile or non-volatile memory or data storage capable of performing the functions described herein. In operation, the memory 126 may store various data and software used during operation of the computing device 100 such operating systems, applications, programs, libraries, and drivers. In particular, the memory 126 includes a legacy stack area 128 and a shadow stack area 130, which may be used at runtime to store the legacy stack and the shadow stack, respectively. Although illustrated as including a single legacy stack area 128 and shadow stack area 130, it should be understood that the memory 126 may include multiple legacy stacks and/or shadow stacks. For example, the memory 126 may include a legacy stack and a shadow stack for each software thread. The memory 126 is communicatively coupled to the processor 120 via the I/O subsystem 124, which may be embodied as circuitry and/or components to facilitate input/output operations with the processor 120, the memory 126, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 100, on a single integrated circuit chip.

The data storage device 132 may be embodied as any type of device or devices configured for short-term or long-term storage of data such as, for example, memory devices and circuits, memory cards, hard disk drives, solid-state drives, or other data storage devices.

Figure 2:
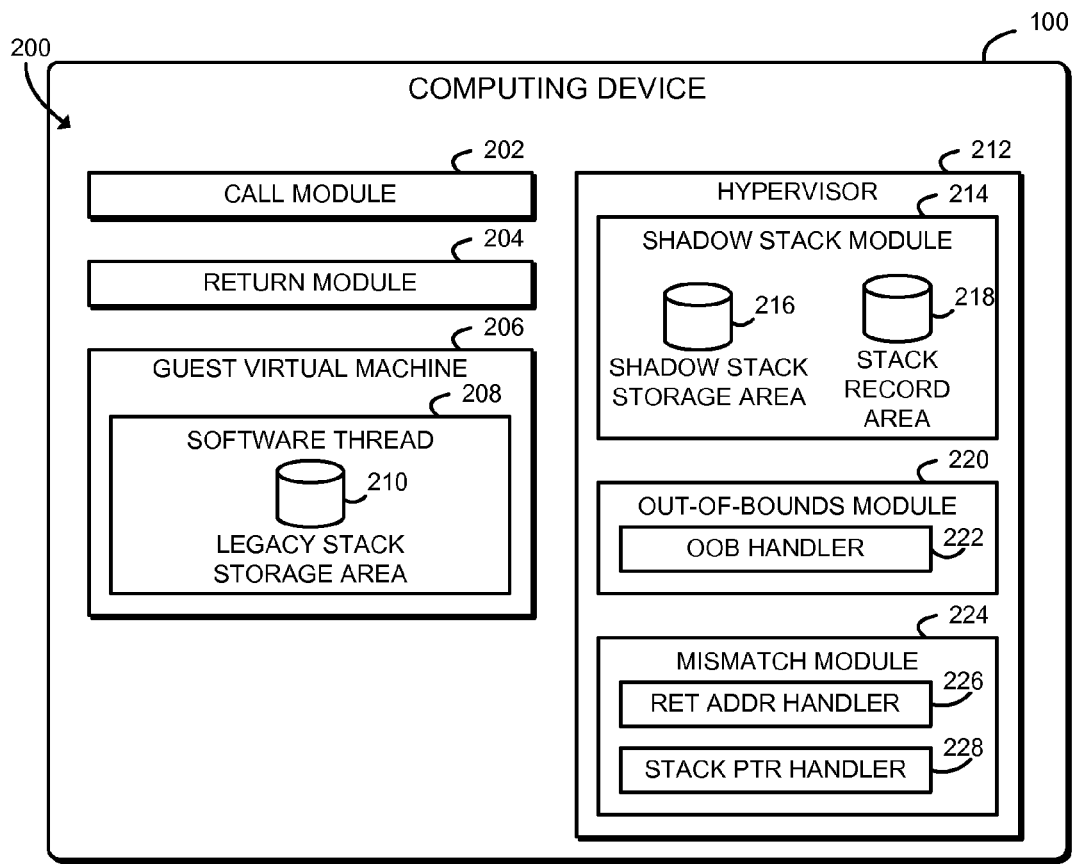
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative embodiment 200 includes a call module 202, a return module 204, a guest virtual machine 206, and a hypervisor 212. The various modules of the environment 200 may be embodied as hardware, firmware, software, or a combination thereof. For example the various modules, logic, and other components of the environment 200 may form a portion of, or otherwise be established by, the processor 120 or other hardware components of the computing device 100.

The call module 202 is configured to execute a call instruction using the processor 120 in stack monitoring mode. During execution of the call instruction, the processor 120 may push a return address onto both the legacy stack and the shadow stack. In some embodiments, the processor 120 may also push the current legacy stack pointer value onto the shadow stack. If the legacy stack pointer is not within stack bounds that have been set by the hypervisor 212, the processor 120 may generate a virtual machine exit.

The return module 204 is configured to execute a return instruction using the processor 120 in stack monitoring mode. During execution of the return instruction, the processor 120 compares the top return address of the shadow stack to the top return address of the legacy stack, and may generate a virtual machine exit if the top return addresses do not match. The processor 120 may also compare a top legacy stack pointer value from the shadow stack to the current legacy stack pointer value and may generate a virtual machine exit if those values do not match. The processor 120 may pop the top return address from the shadow stack and the legacy stack, and in some embodiments may pop the legacy stack pointer value from the shadow stack.

The guest virtual machine 206 is configured to perform a virtualized workload on the computing device 100, such as executing a guest operating system and/or applications. The guest virtual machine 206 may have restricted control over the computing device 100. For example, the guest virtual machine may operate in a VMX-non-root mode that restricts access to certain hardware instructions. The guest virtual machine 206 may also have restricted access to parts of the memory 126, for example with access restrictions enforced using page tables or extended page tables (EPT). As shown in FIG. 2, the guest virtual machine 206 further includes a software thread 208. The software thread 208 may be embodied as or established by an application, process, operating system, or other entity established in the guest virtual machine 206. The software thread 208 establishes legacy stack storage area 210. The legacy stack storage area 210 may include stack contents, such as return addresses and automatic variables stored on the stack, as well as metadata such as a legacy stack pointer and/or a stack base pointer. In some embodiments, certain data such as the legacy stack pointer may be stored in one or more hardware registers of the processor 120. For example, in the Intel® 64 architecture, the legacy stack pointer may be stored in the RSP register. Additionally, in many processor architectures, including the Intel® 64 architecture, the stack grows downwardly, meaning that the "top" entry of the stack is located at the lowest address in the memory 126. Although illustrated as including a single guest virtual machine 206 with a single software thread 208, it should be understood that the environment 200 may include many guest virtual machines 206, and each guest virtual machine may include many software threads 208.

The hypervisor 212 may be embodied as any virtual machine monitor, hypervisor, or other component that allows a virtualized workload to be executed on the computing device 100. The hypervisor 212 may have complete control over the computing device 100, for example by executing in a VMX-root mode. The hypervisor 212 is configured to protect part of the memory 126 from access by the guest virtual machine 206. The hypervisor establishes a shadow stack module 214, an out-of-bounds module 220, and a mismatch module 224. Although illustrated as a hypervisor 212, it should be understood that the environment 200 may instead include another privileged component that does not execute virtualized workloads, such as an operating system executing in ringlevel 0. Those embodiments may provide some level of protection against ROP exploits, even if the shadow stack may be stored in memory 126 that is accessible to the software being protected (e.g., the software thread 208).

The shadow stack module 214 is configured to manage the shadow stack, including shadow stack storage area 216 and stack record metadata area 218. The shadow stack storage area 216 may be used to store the contents of one or more shadow stacks. Each shadow stack may be associated with a single software thread 208. The stack record metadata area 218 may be used to store a number of stack records, with each stack record associated with a corresponding shadow stack and legacy stack. For example, each stack record may include a shadow stack pointer, a legacy stack pointer, stack bounds, or other metadata such as security counters or a stack hazardous flag. At runtime, the shadow stack storage area 216 and the stack record metadata area 218 are stored in memory 126 that may not be accessed by software of the guest virtual machine 206.

The out-of-bounds module 220 is configured to execute a stack out-of-bounds handler 222 in response to a stack out-of-bounds virtual machine exit generated by the call module 202. In particular, the out-of-bounds module 220 may be configured to adjust the stack record metadata area 218 to changes in the current legacy stack, allocate additional space in the memory 126 for the shadow stack, and update the stack bounds checked by the shadow stack support 122 of the processor 120. The stack out-of-bounds handler 222 may be embodied as any function, interrupt service route, or other procedure that may be executed in the context of the hypervisor 212 in response to the stack out-of-bounds virtual machine exit.

The mismatch module 224 is configured to execute a stack return address mismatch handler 226 in response to a stack mismatch virtual machine exit generated by the return module 204. In some embodiments, the mismatch module 224 may also be configured to execute a stack pointer mismatch handler 228 in response to a stack pointer virtual machine exit generated by the return module 204. In particular, the mismatch module 224 may be configured to determine whether the stack mismatch virtual machine exit was likely caused by a malicious return-oriented programming (ROP) exploit or by legitimate software. The mismatch module 224 is configured to handle a suspected ROP exploit, for example by terminating the software thread 208, and to allow legitimate software to continue, for example by resuming the guest virtual machine 206. The stack return address mismatch handler 226 and/or the stack pointer mismatch handler 228 may be embodied as any function, interrupt service route, or other procedure that may be executed in the context of the hypervisor 212 in response to the stack mismatch virtual machine exit.

Figure 3:
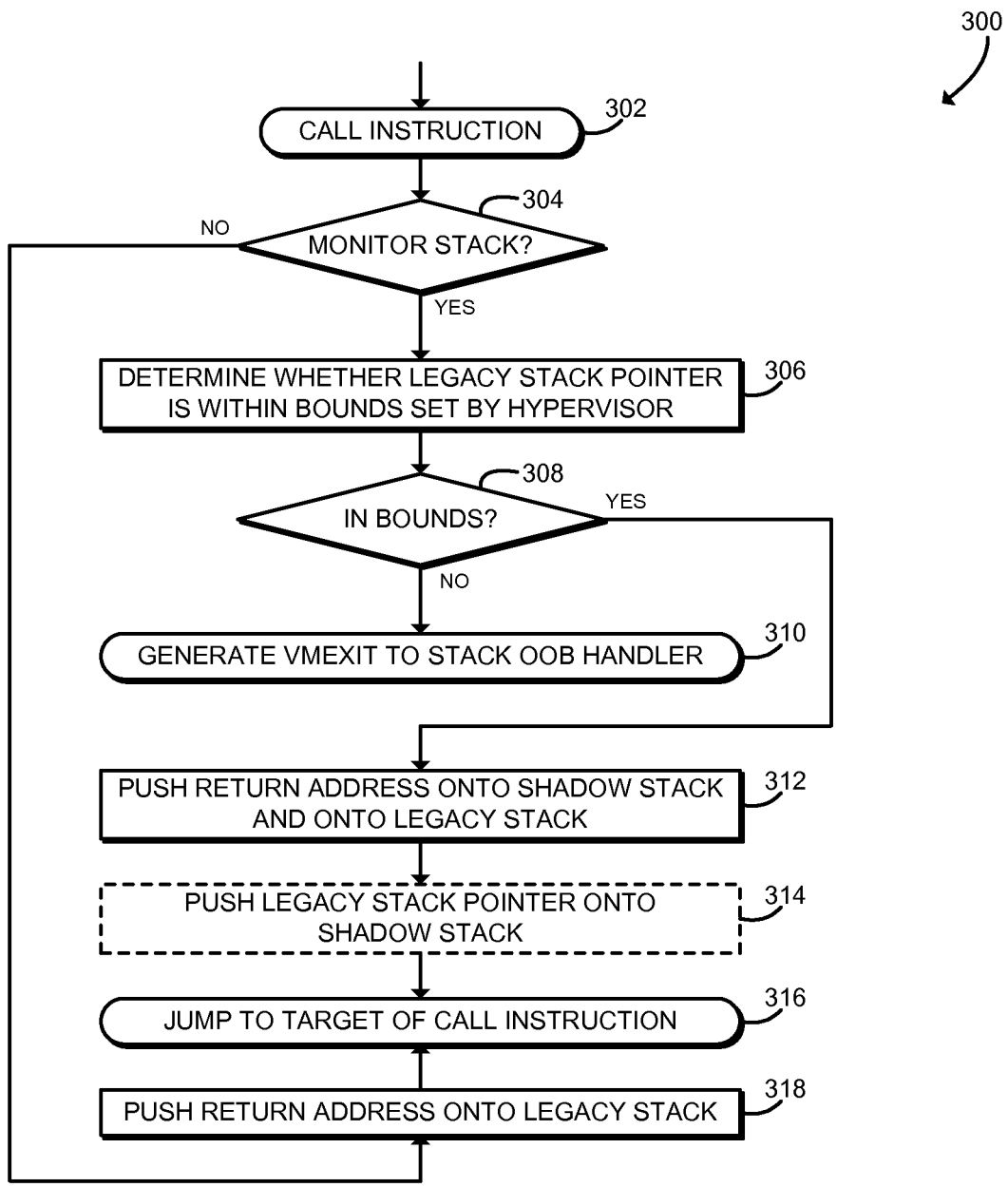
FIG. 3 is a simplified flow diagram of at least one embodiment of a method for executing a call instruction that may be executed by the computing device of FIGS. 1 and 2.

Referring now to FIG. 3, in use, the computing device 100 may execute a method 300 for executing a call instruction. The method 300 may be executed by hardware, microcode, firmware, or other components of the processor 120. The method 300 begins in block 302, in which the computing device 100 encounters a call instruction with the processor 120. The call instruction may originate from the software thread 208 executing in the guest virtual machine 206. The call instruction may be embodied as any processor instruction that causes a jump of execution to specified procedure and stores return address information on the legacy stack. For example, the call instruction may be embodied as a CALL instruction in the Intel® 64 architecture.

In block 304, the computing device 100 determines whether to monitor the legacy stack. The computing device 100 may monitor the legacy stack, for example, if the processor 120 is in the stack monitoring mode or if the shadow stack support 122 of the processor 120 has otherwise been enabled. If the computing device 100 determines to monitor the legacy stack, the method 300 advances to block 306, described below. If the computing device 100 determines not to monitor the legacy stack, the method 300 branches to block 318 to perform a legacy call instruction.

In block 318, the processor 120 pushes a return address onto the legacy stack. The processor 120 may push, for example, the current value of the instruction pointer of the processor 120, or may push the next instruction address after the current value of the instruction pointer. After pushing the return address onto the legacy stack, the method 300 advances to block 316, in which the processor 120 jumps to the target of the call instruction. The target of the call instruction may be any location in memory, such as a function, method, or other procedure. The processor 120 may also perform any other operation typically performed by a call instruction or required by a calling convention, for example pushing a stack base pointer onto the legacy stack. After jumping to the target of the call instruction, execution of the call instruction is complete, and the method 300 is completed.

Referring back to block 304, if the computing device 100 determines to monitor the legacy stack, the method 300 advances to block 306, in which the processor 120 determines whether the legacy stack pointer is within bounds set by the hypervisor 212. The bounds may be embodied as any memory address or address range accessible to the processor 120. For example, the bounds may be defined by one or more registers of the processor 120 or by one or more variables stored in the memory 126. As further described below, the bounds may indicate maximum allowed growth of the legacy stack. In block 308, the computing device 100 determines whether the legacy stack pointer is within bounds. If in bounds, the method 300 advances to block 312, described below. If out of bounds, the method 300 advances to block 310.

In block 310, the processor 120 generates a virtual machine exit to the stack out-of-bounds handler 222. The virtual machine exit (also known as a VMexit) may be embodied as any interrupt, exception, fault, hypercall, system call, or other signal that may be received by or otherwise handled by the hypervisor 212. For example, in some embodiments, the processor 120 may trigger a hardware-assisted context switch from the guest virtual machine 206 to the hypervisor 212. In some embodiments, the VMexit may include parameters or other data identifying the cause of the VMexit (i.e., stack out-of-bounds). The VMexit may trigger the out-of-bounds handler 222 directly, or in some embodiments, the hypervisor 212 may receive the VMexit and invoke the out-of-bounds handler 222. The out-of-bounds handler 222 may allocate additional memory for the shadow stack, update the stack bounds to encompass the legacy stack pointer, or perform other stack maintenance activities. One embodiment of a method for the out-of-bounds handler 222 is described below in connection with FIGS. 5-7. After triggering the VMexit, the method 300 is completed.

Additionally, although illustrated as generating a VMexit to trigger the out-of-bounds handler 222, in other embodiments the processor 120 may generate an interrupt or other mechanism of invoking the out-of-bounds handler 222 at the same privilege level as the software being protected. For example, as described above, some embodiments may include an operating system executing in ringlevel 0, rather than the hypervisor 212.

Referring back to block 308, if the legacy stack pointer is within bounds, the method 300 advances to block 312, in which the processor 120 pushes a return address onto the legacy stack and onto the shadow stack. The processor 120 may push, for example, the current value of the instruction pointer of the processor 120, or may push the next instruction address after the current value of the instruction pointer. In some embodiments, the processor 120 may update the legacy stack pointer and a shadow stack pointer accordingly after pushing the return address onto the respective legacy stack and shadow stack. In some embodiments, in block 314, the processor 120 may push the legacy stack pointer value onto the shadow stack. As further described below, the legacy stack pointer value may be used to perform additional checks, for example to determine if a stack pivot has occurred.

In block 316, as described above, the processor 120 jumps to the target of the call instruction. The target of the call instruction may be any location in memory, such as a function, method, or other procedure. The processor 120 may also perform any other operation typically performed by a call instruction or required by a calling convention, for example pushing a stack base pointer onto the legacy stack. After jumping to the target of the call instruction, execution of the call instruction is complete and the method 300 is completed.

Figure 4:
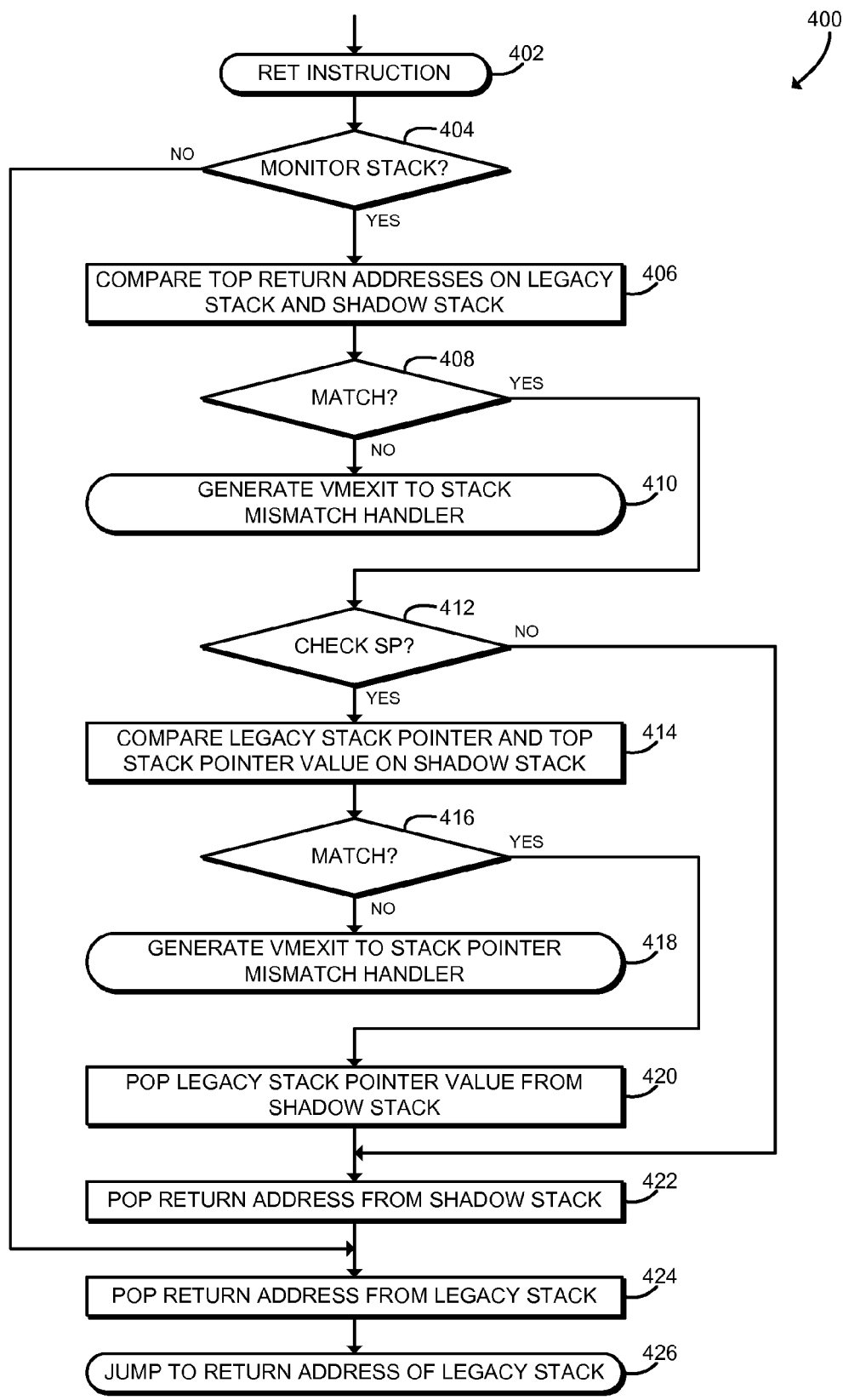
FIG. 4 is a simplified flow diagram of at least one embodiment of a method for executing a return instruction that may be executed by the computing device of FIGS. 1 and 2.

Referring now to FIG. 4, in use, the computing device 100 may execute a method 400 for executing a return instruction. The method 400 may be executed by hardware, microcode, firmware, or other components of the processor 120. The method 400 begins in block 402, in which the computing device 100 encounters a return instruction with the processor 120. The return instruction may originate from the software thread 208 executing in the guest virtual machine 206. The return instruction may be embodied as any processor instruction that causes a jump of execution to a return address stored on the legacy stack and removes the return address from the stack. For example, the return instruction may be embodied as a RET instruction in the Intel® 64 architecture.

In block 404, the computing device 100 determines whether to monitor the legacy stack. The computing device 100 may monitor the legacy stack, for example, if the processor 120 is in the stack monitoring mode or if the shadow stack support 122 of the processor 120 has otherwise been enabled. If the computing device 100 determines not to monitor the legacy stack, the method 400 branches ahead to block 424 to perform a legacy return instruction, described below. If the computing device 100 determines to monitor the legacy stack, the method 400 advances to block 406.

In block 406, the processor 120 compares the top return address stored on the legacy stack with the top return address stored on the shadow stack. The particular location of the top return address within the legacy stack and/or the shadow stack may depend on the particular semantics of the call and/or return instructions of the processor 120 or the calling convention in use. For example, the top return address of the legacy stack may be stored at the legacy stack pointer or at a predetermined offset from the legacy stack pointer in the memory 126. Similarly, the top return address of the shadow stack may be stored at the shadow stack pointer or at a predetermined offset from the shadow stack pointer in the memory 126. In some embodiments, the top return address of the shadow stack may be stored above a stored stack pointer value in the memory 126 (i.e., the stored stack pointer value may be located at the top of the shadow stack). In block 408, the processor 120 determines whether the top return address of the shadow stack matches the top return address of the legacy stack. If the top return addresses match, the method 400 branches ahead to block 412, described below. If the top return addresses do not match—or if the shadow stack is empty or otherwise does not include a top return address—the method 400 advances to block 410.

In block 410, the processor 120 generates a virtual machine exit (VMexit) to the stack return address mismatch handler 224. As described above in connection with FIG. 3, the VMexit may be embodied as any interrupt, exception, fault, hypercall, system call, or other signal that may be received by or otherwise handled by the hypervisor 212. For example, in some embodiments, the processor 120 may trigger a hardware-assisted context switch from the guest virtual machine 206 to the hypervisor 212. In some embodiments, the VMexit may include parameters or other data identifying the cause of the VMexit (i.e., return address mismatch). The VMexit may trigger the mismatch handler 224 directly, or in some embodiments, the hypervisor 212 may receive the VMexit and invoke the mismatch handler 224. The mismatch handler 224 may determine whether the return address mismatch is likely to be malicious or legitimate, and may perform one or more security operations if the mismatch is malicious or likely to be malicious. Embodiments of methods for the mismatch handler 224 are described below in connection with FIGS. 8-9. After triggering the VMexit, the method 400 is completed.

Additionally, although illustrated as generating a VMexit to trigger the stack return address mismatch handler 224, in other embodiments the processor 120 may generate an interrupt or other mechanism of invoking the stack return address mismatch handler 224 at the same privilege level as the software being protected. For example, as described above, some embodiments may include an operating system executing in ringlevel 0, rather than the hypervisor 212.

Referring back to block 408, if the top return addresses match, the method 400 advances to block 412, in which the computing device 100 determines whether to check for a stack pointer mismatch. The computing device 100 may check for stack pointer mismatch if the legacy stack pointer value was stored in the shadow stack during a call instruction, as described above in connection with block 314 of FIG. 3. If not checking for stack pointer mismatch, the method 400 branches ahead to block 422, described below. If checking for stack pointer mismatch, the method 400 advances to block 414.

In block 414, the processor 120 compares the legacy stack pointer with the top legacy stack pointer value stored on the shadow stack. The particular location of the top legacy stack pointer value within the shadow stack may depend on the particular semantics of the call and/or return instructions of the processor 120 or the calling convention in use. For example, the top legacy stack pointer value of the shadow stack may be stored at the shadow stack pointer or immediately above the shadow stack pointer in the memory 126. In block 416, the processor 120 determines whether the top legacy stack pointer value of the shadow stack matches the legacy stack pointer. If the legacy stack pointer values match, the method 400 branches ahead to block 420, described below. If the legacy stack pointer values do not match—or if the shadow stack is empty or otherwise does not include a top legacy stack pointer value—the method 400 advances to block 418.

In block 418, the processor 120 generates a virtual machine exit (VMexit) to the stack pointer mismatch handler 226. As described above, the VMexit may be embodied as any interrupt, exception, fault, hypercall, system call, or other signal that may be received by or otherwise handled by the hypervisor 212. For example, in some embodiments, the processor 120 may trigger a hardware-assisted context switch from the guest virtual machine 206 to the hypervisor 212. In some embodiments, the VMexit may include parameters or other data identifying the cause of the VMexit (i.e., stack pointer mismatch). The VMexit may trigger the mismatch handler 226 directly, or in some embodiments, the hypervisor 212 may receive the VMexit and invoke the mismatch handler 226. The mismatch handler 226 may determine whether the stack pointer mismatch is likely to be malicious or legitimate, and may perform one or more security operations if the mismatch is malicious or likely to be malicious. Embodiments of methods for the mismatch handler 226 are described below in connection with FIGS. 8-9. After triggering the VMexit, the method 400 is completed.

Additionally, although illustrated as generating a VMexit to trigger the stack pointer mismatch handler 226, in other embodiments the processor 120 may generate an interrupt or other mechanism of invoking the stack pointer mismatch handler 226 at the same privilege level as the software being protected. For example, as described above, some embodiments may include an operating system executing in ringlevel 0, rather than the hypervisor 212.

Referring back to block 416, if the legacy stack pointer matches the top legacy stack pointer value of the shadow stack, the method 400 branches ahead to block 420, in which the processor 120 pops the legacy stack pointer value from the shadow stack. Note that the processor 120 may not similarly pop a value from the legacy stack. After popping the legacy stack pointer value from the shadow stack, the method 400 advances to block 422. Additionally, referring back to block 412, if the computing device 100 determines not to check for stack pointer mismatch, the method 400 branches ahead to block 422.

In block 422, the processor 120 pops the return address from the shadow stack. After popping the return address from the shadow stack, the method 400 advances to block 424. Additionally, referring back to block 404, if the computing device 100 determines not to monitor the legacy stack, the method 400 branches ahead to block 424.

In block 424, the processor 120 pops the return address from the legacy stack. The processor 120 may also perform any other operations typically performed by a legacy return instruction. In block 426, the processor 120 jumps to the return address popped from the legacy stack, completing execution of the return instruction. After completing execution of the return instruction, the method 400 is completed.

Figure 5:
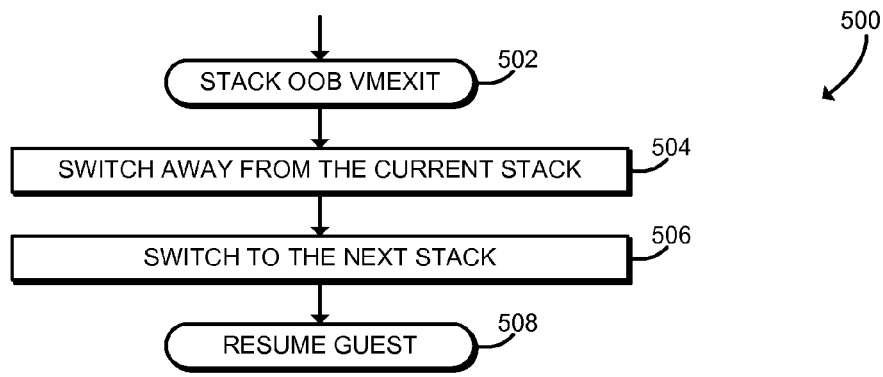
FIG. 5 is a simplified flow diagram of at least one embodiment of a method for handling a stack out-of-bounds virtual machine exit that may be executed by the computing device of FIGS. 1 and 2.

Referring now to FIG. 5, in use, the computing device 100 may execute a method 500 for handling a stack out-of-bounds event. The method 500 may be executed by the hypervisor 212 of the computing device 100. The method 500 begins in block 502, in which the computing device 100 encounters a stack out-of-bounds virtual machine exit (VMexit). As described above, the VMexit may trigger a hardware-assisted context switch from the guest virtual machine 206 to the hypervisor 212. The VMexit may be generated by the processor 120 during execution of a call instruction as described above in connection with FIG. 3.

In block 504, the computing device 100 switches away from the current legacy stack. The computing device 100 may update the stack record metadata area 218 associated with legacy stack and/or the shadow stack to switch away from the legacy stack. For example, the computing device 100 may store the current shadow stack pointer in the stack record metadata area 218, update stack aging information, or otherwise update the stack record metadata area 218. In some embodiments, the computing device 100 may disable the shadow stack support 122 of the processor 120 if stack monitoring will not be used after handling the stack out-of-bounds event. One embodiment of a method for switching away from the current legacy stack is described below in connection with FIG. 6.

In block 506, the computing device 100 switches to the next legacy stack. The computing device 100 may update the stack record metadata area 218 associated with the legacy stack and/or the shadow stack to switch to the new legacy stack. The computing device 100 may also allocate space for the shadow stack. The computing device 100 may also update the stack bounds based on the new legacy stack. One embodiment of a method for switching to the next legacy stack is described below in connection with FIG. 7. In block 508, the computing device 100 resumes the guest software thread 208, which continues using the new legacy stack. After resuming the software thread 208, the method 500 is complete.

Although illustrated as switching away from the current stack to the next stack in response to a stack out-of-bounds VMexit event, in some embodiments the hypervisor 212 of the computing device 100 may also switch away from the current stack and to the next stack in other circumstances. For example, the computing device 100 may switch away from the current stack in response to a process switch of the guest virtual machine 206. If the next process is listed in a list of processes to be monitored, the computing device 100 may switch to the next stack. Additionally or alternatively, the computing device 100 may monitor for the guest virtual machine 206 enabling or disabling memory paging. The computing device 100 may switch away from the current stack in response to disabling memory paging, and may switch to the next stack in response to enabling memory paging.

Figure 6:
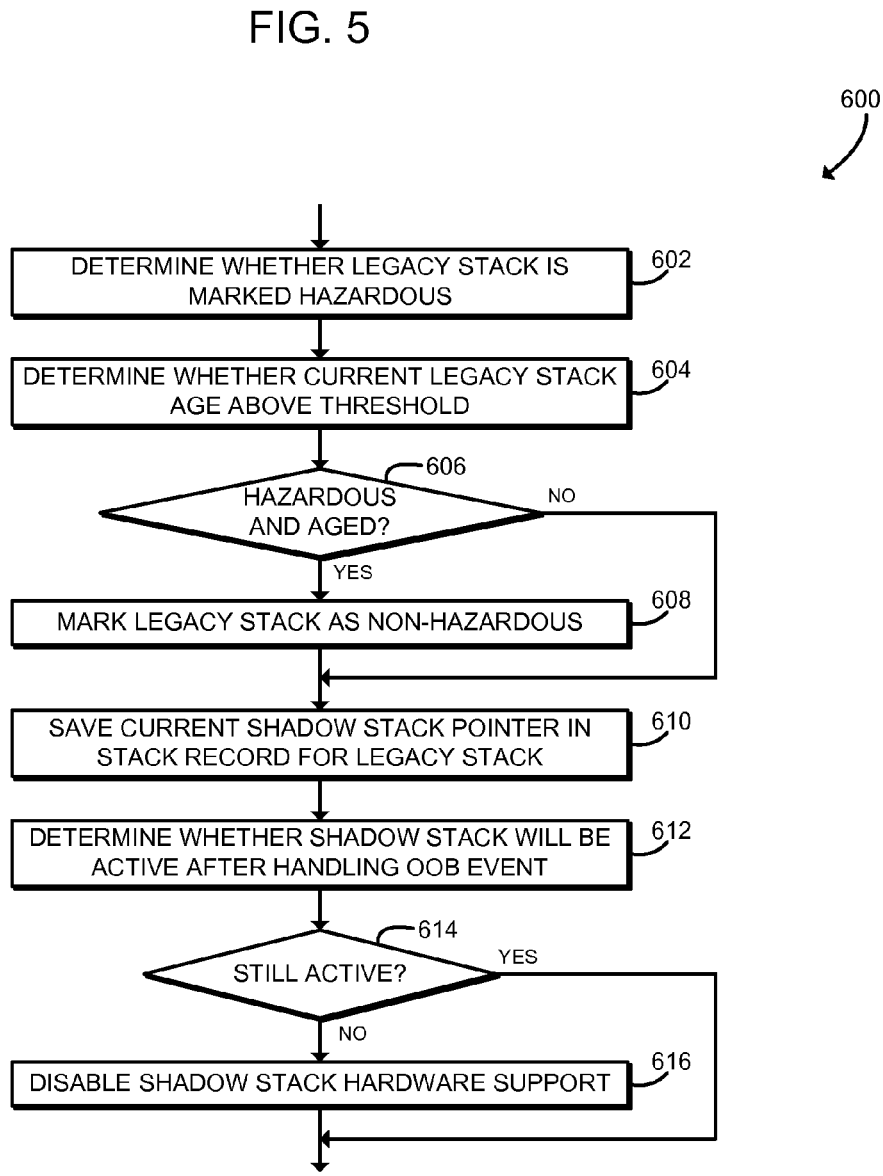
FIG. 6 is a simplified flow diagram of at least one embodiment of a method for switching away from a current stack that may be executed by the computing device of FIGS. 1 and 2.

Referring now to FIG. 6, in use, the computing device 100 may execute a method 600 for switching away from the current legacy stack. The method 600 may be executed by the stack out-of-bounds handler 222, as described above in connection with block 504 of FIG. 5. The method 600 begins in block 602, in which the computing device 100 determines whether the legacy stack associated with the current guest software thread 208 has been marked as hazardous. The computing device 100 may reference, for example, a hazardous flag maintained in the stack record metadata area 218 associated with the current legacy stack. In block 604, the computing device 100 determines whether the age of the current legacy stack is above a predefined threshold age. For example, the computing device 100 may examine a first usage time stored in the stack record metadata area 218 associated with the current legacy stack.

In block 606, the computing device 100 determines whether the current legacy stack is both marked hazardous and older than the threshold age. If not, the method 600 branches ahead to block 610, described below. If the current legacy stack is marked hazardous and older than the threshold age, the method 600 advances to block 608, in which the computing device 100 marks the legacy stack as non-hazardous. The computing device 100 may, for example, unset the hazardous flag maintained in the stack record metadata area 218 associated with the current legacy stack. In some embodiments, the computing device 100 may also add the current value of the instruction pointer of the processor 120 to a whitelist or otherwise mark the instruction pointer as trusted. In those embodiments, future legacy stacks to which that address switches may not be marked as hazardous.

In block 610, the computing device 100 saves the current value of the shadow stack pointer in the stack record metadata area 218 associated with the legacy stack. In block 612, the computing device 100 determines whether the shadow stack will be active after handling the stack out-of-bounds VMexit event. For example, privileged code (e.g., code executing in ring level 0) may not have monitoring enabled. In block 614, the computing device 100 determines whether the shadow stack will still be active. If so, the method 600 is completed. If not, the method 600 advances to block 616, in which the computing device 100 disables the shadow stack support 122 of the processor 120. After disabling the shadow stack support 122, the method 600 is completed.

Figure 7:
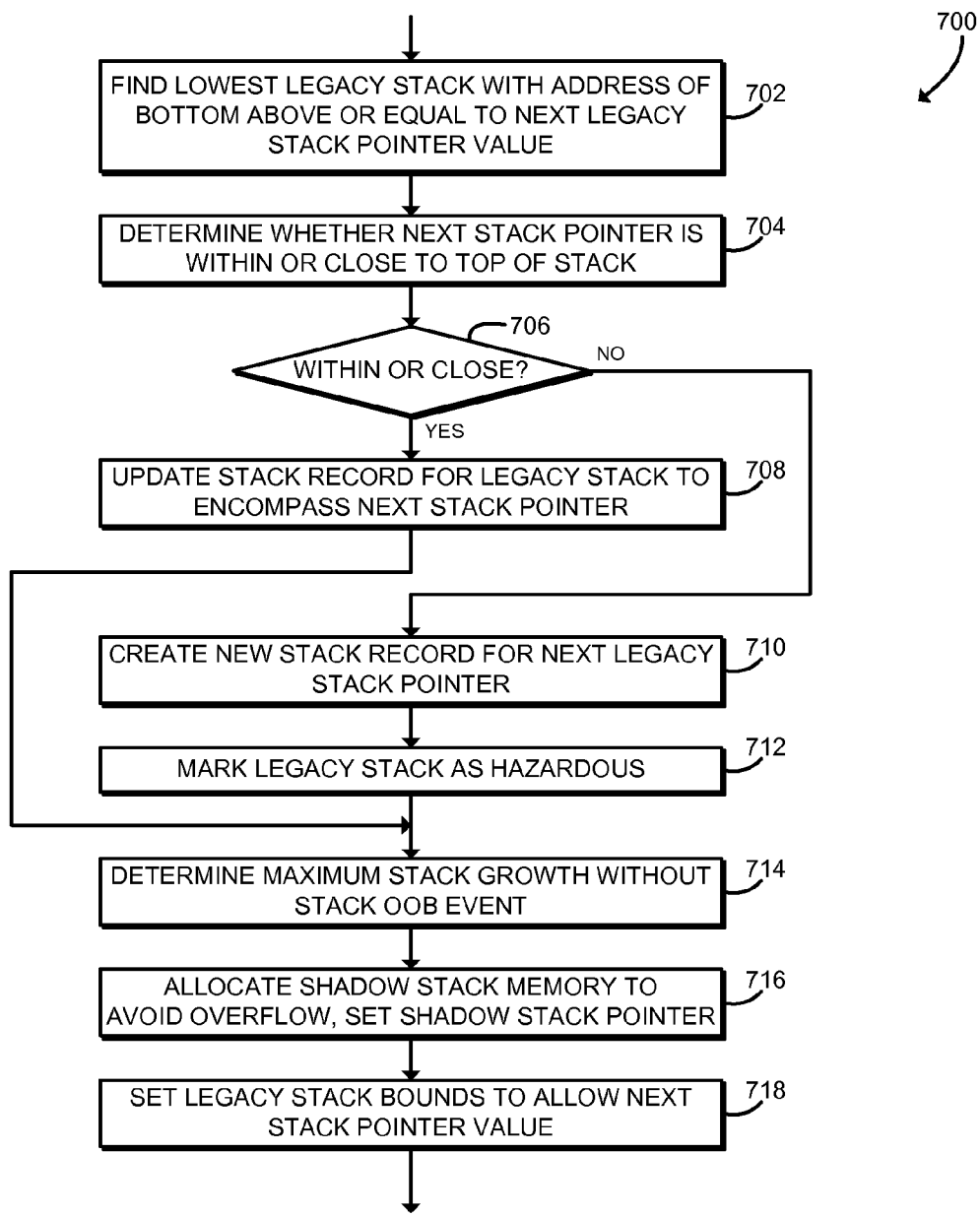
FIG. 7 is a simplified flow diagram of at least one embodiment of a method for switching to a next stack that may be executed by the computing device of FIGS. 1 and 2.

Referring now to FIG. 7, in use, the computing device 100 may execute a method 700 for switching to the next legacy stack. The method 700 may be executed by the stack out-of-bounds handler 222, as described above in connection with block 506 of FIG. 5. The method 700 begins in block 702, in which the computing device 100 finds the lowest legacy stack in the memory 126 with a memory address of the stack bottom that is above or equal to the next legacy stack pointer value. The next legacy stack pointer value may be provided as a parameter or other data associated with the stack out-of-bounds VMexit. As described above, for many computer architectures (such as Intel® 64) the legacy stack grows downward in the memory 126. In other words, the "top" entry of the legacy stack is located at a lower address in the memory 126. Thus, finding the lowest legacy stack with a stack bottom above the next legacy stack pointer value in the memory 126 finds a legacy stack that encompasses the next legacy stack pointer or may grow to include the next legacy stack pointer value.

In block 704, the computing device 100 determines whether the next legacy stack pointer value is within memory space allocated to the legacy stack found in block 702 above or if the next legacy stack pointer value is close to the top of that legacy stack. The computing device 100 may determine, for example, whether the next legacy stack pointer value is located within a predetermined distance below the top of that legacy stack in the memory 126. In block 706, the computing device 100 determines whether the next legacy stack pointer value is within or close to the legacy stack. If not, the method 700 branches ahead to block 710, described below. If located within or close to the legacy stack, the method 700 advances to block 708.

In block 708, the computing device 100 updates the stack record metadata area 218 associated with the legacy stack found in block 702 above to encompass the next legacy stack pointer value. The computing device 100 may, for example, allocate additional memory for the legacy stack, update bounds associated with the legacy stack, or perform any other operation to allow that stack record metadata area 218 to encompass the next legacy stack pointer value. After adjusting the stack record metadata area 218, the method 700 branches ahead to block 714, described below.

Referring back to block 706, if the next legacy stack pointer value is not within or close to the legacy stack, the method 700 branches ahead to block 710, in which the computing device 100 creates a new stack record in the stack record metadata area 218 for a new legacy stack that encompasses the next legacy stack pointer value. The computing device 100 may, for example, allocate additional memory for the new legacy stack, update bounds associated with the new legacy stack, or perform any other operation to allow the new legacy stack to encompass the next legacy stack pointer value. In block 712, the computing device 100 marks the new legacy stack as hazardous. The computing device 100 may, for example, set a hazardous flag in the stack record metadata area 218 associated with the new legacy stack. Marking the legacy stack as hazardous may indicate that the legacy stack has been newly created. In some embodiments, the computing device 100 may not mark the new legacy stack as hazardous if the current instruction pointer value of the processor 120 has been whitelisted or otherwise previously marked as trusted, as described above in connection with block 608 of FIG. 6.

In block 714, the computing device 100 determines the maximum stack growth of the legacy stack that may occur without triggering another stack out-of-bounds VMexit. The computing device 100 may, for example, determine the distance between the next legacy stack pointer value and a lower bound memory address of the legacy stack stored in the stack record metadata area 218. In block 716, the computing device 100 allocates sufficient memory for the shadow stack to avoid overflow and sets the shadow stack pointer to point to the newly allocated shadow stack memory. The computing device 100 may, for example, allocate sufficient memory to include the maximum stack growth determined in block 714. As another example, the processor 120 may check bounds on the shadow stack and if those bounds are exceeded generate a VMexit, an interrupt, or another mechanism of invoking the stack pointer mismatch handler 226 at the same privilege level as the software being protected. Additionally or alternatively, the processor 120 may place the shadow stack into paged memory so that guard pages may be used. As described above, the shadow stack is allocated in memory maintained by the hypervisor 212 and is inaccessible to the guest virtual machine 206. In block 718, the computing device 100 sets legacy stack bounds so that the shadow stack support 122 of the processor 120 will allow the next legacy stack pointer value. For example, the computing device 100 may set one or more registers of the processor 120 or memory locations of the memory 126 to include the new bounds. The bounds may be set to encompass the new legacy stack pointer value, and in some embodiments may encompass the maximum stack growth determined in block 714. After setting the legacy stack bounds, the method 700 is completed.

Figure 8:
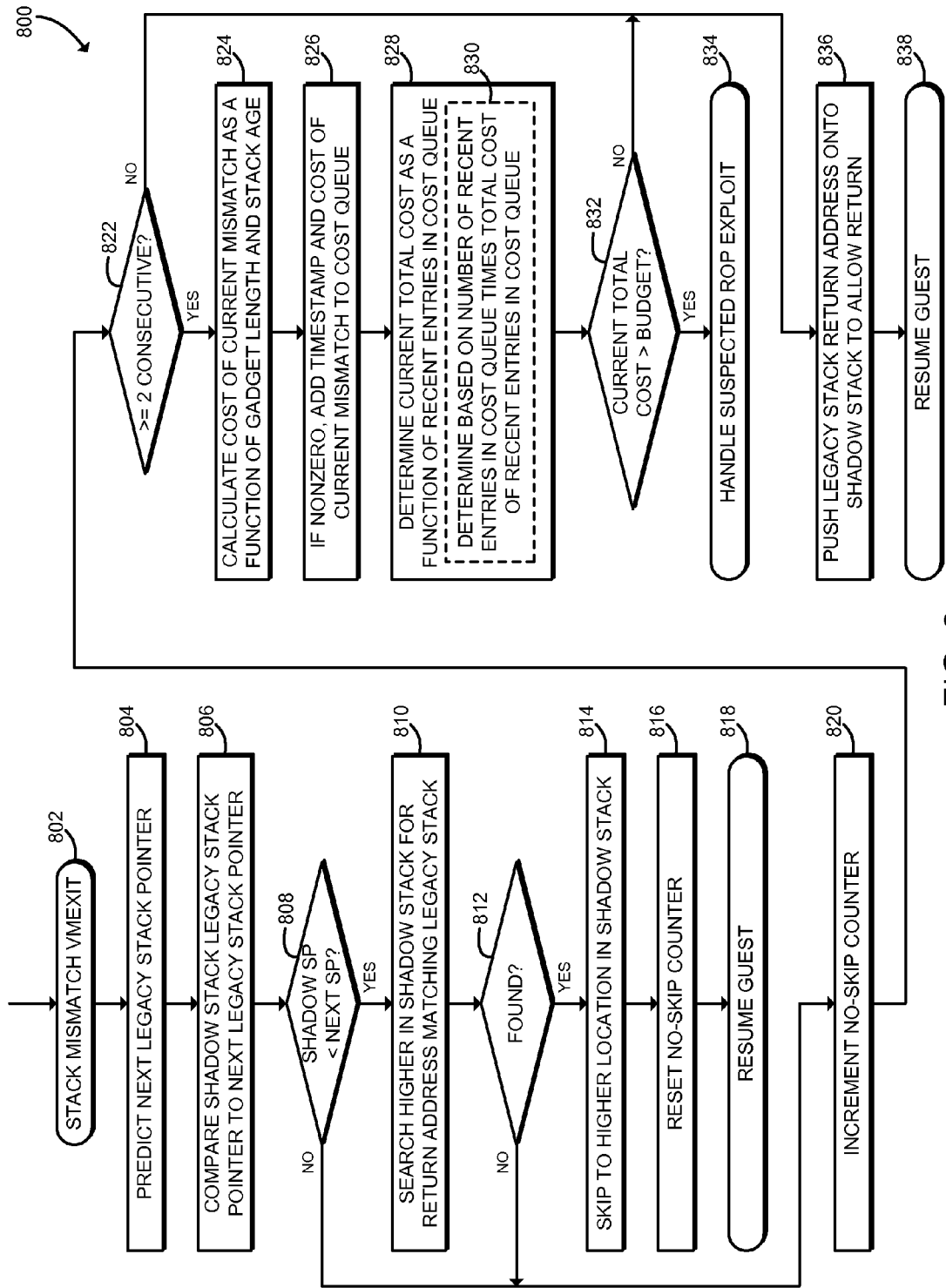
FIG. 8 is a simplified flow diagram of at least one embodiment of a method for handling a stack mismatch virtual machine exit that may be executed by the computing device of FIGS. 1 and 2.

Referring now to FIG. 8, in use, the computing device 100 may execute a method 800 for handling a stack mismatch event. The method 800 may be executed by the hypervisor 212 of the computing device 100. The method 800 begins in block 802, in which the computing device 100 encounters a stack mismatch virtual machine exit (VMexit). As described above, the VMexit may trigger a hardware-assisted context switch from the guest virtual machine 206 to the hypervisor 212. The VMexit may be generated by the processor 120 during execution of a return instruction as described above in connection with FIG. 4. For example, the VMexit may be embodied as a stack return address mismatch VMexit as described above in connection with block 410 of FIG. 4, or a stack pointer mismatch VMexit as described above in connection with block 418 of FIG. 4.

In block 804, the computing device 100 predicts the value of the next legacy stack pointer. The computing device 100 may predict the value that the legacy stack pointer will assume after the return instruction, which pops one or more items off of the legacy stack. As described above, for many computer architectures including the Intel® 64 architecture, the legacy stack grows downward. Thus, to predict the next value of the legacy stack pointer after executing a return instruction, the computing device 100 may add a fixed offset to the current value of the legacy stack pointer. For example, depending on the mode of the processor 120 (e.g., 32-bit or 64-bit mode), the computing device 100 may add four or eight to the current legacy stack pointer to determine the next legacy stack pointer value.

In block 806, the computing device 100 compares the legacy stack pointer value stored on the shadow stack to the predicted value of the next legacy stack pointer. As described above in connection with block 314 of FIG. 3, the processor 120 may push the value of the legacy stack pointer onto the shadow stack during execution of the call instruction. If the stored legacy stack pointer value on the shadow stack does not match the predicted next legacy stack pointer, then malicious software may have performed a "stack pivot," that is, switched to a malicious stack, for example to perform a return-oriented programming exploit. However, some legitimate software may also cause the stored legacy stack pointer value on the shadow stack to fail to match the predicted next legacy stack pointer value. For example, legitimate software may skip parts of the legacy stack, for example as part of exception handling or using the setjmp/longjmp functions.

In block 808, the computing device 100 determines whether the legacy stack pointer value stored on the shadow stack is less than the predicted next legacy stack pointer value. As described above, this may indicate that legitimate software has skipped part of the legacy stack. If the legacy stack pointer value stored on the shadow stack is not less than the predicted next legacy stack pointer value, the method 800 branches ahead to block 820, described below. If the legacy stack pointer value stored on the shadow stack is less than the predicted next legacy stack pointer value, the method 800 advances to block 810.

In block 810, the computing device 100 searches higher in the shadow stack for a return address that matches the top return address of the legacy stack. The computing device 100 may also ensure that the matching return address is associated with a stored legacy stack pointer value that is no higher than the predicted legacy stack pointer value. In block 812, the computing device 100 determines whether a matching return address was found higher on the shadow stack. As described above, if the return address is found, then legitimate software may have skipped part of the legacy stack. If the return address was not found, the method 800 branches ahead to block 820, described below. If the return address was found, the method 800 advances to block 814.

In block 814, the computing device 100 skips to a higher location in the shadow stack. The computing device 100 may, for example, repeatedly pop items off the shadow stack or otherwise adjust the shadow stack pointer to skip up the stack. The computing device 100 may skip up the shadow stack until the top return address of the shadow stack matches the top return address of the legacy stack. In block 816, the computing device 100 resets a no-skip counter to zero. As further described below, the no-skip counter may be used to determine how many consecutive stack mismatch VMexits could not be handled by skipping up the shadow stack. The no-skip counter may be stored, for example, in the stack record metadata area 218, and may be associated with a particular software thread 208. In block 818, the computing device 100 resumes the guest software thread 208 of the guest virtual machine 206. Because the top return addresses of the shadow stack and the legacy stack now match, the return instruction that previously caused the VMexit may now complete execution. After resuming the guest software thread 208, the method 800 is completed.

Referring back to block 808, if the legacy stack pointer value stored on the shadow stack is not less than the predicted next legacy stack pointer value, the method 800 branches ahead to block 820. Additionally referring back to block 812, if the return address was not found higher on the shadow stack, the method 800 branches ahead to block 820, in which the computing device 100 increments the no-skip counter. Incrementing the no-skip counter indicates that the stack mismatch VMexit could not be handled by skipping part of the shadow stack. In block 822, the computing device 100 determines whether two or more consecutive stack mismatch VMexits could not be handled by skipping part of the shadow stack. The computing device 100 may, for example, determine whether the no-skip counter is greater than or equal to two. Additionally, although illustrated as requiring two consecutive stack mismatch VMexits, in some embodiments the computing device 100 may compare the number of consecutive stack mismatch VMexits to any appropriate predefined threshold number of consecutive stack mismatches. If the number of consecutive stack mismatches is not greater than or equal to the threshold, the method 800 branches ahead to block 836, described below. If the number of consecutive stack mismatches is greater than or equal to the threshold, the method 800 advances to block 824.

In block 824, the computing device 100 calculates a cost value associated with the current stack mismatch VMexit as a function of an estimated gadget length and an age of the legacy stack. The gadget length identifies the distance between entry into a gadget and the return instruction at the end of the gadget. Typical return-oriented programming (ROP) gadgets are short; thus, short gadget length indicates the possibility of malicious behavior and accordingly has a higher cost. Approximate gadget length may be determined as the difference between the current instruction pointer value (e.g., the address of the return instruction that triggered the stack mismatch VMexit) and the previous return destination of the computing device 100, which may be stored, for example, in the stack record metadata area 218. The approximate gadget length may be normalized to treat all short gadgets similarly, and the cost may be computed to assign a higher cost value to short gadgets. For example, the gadget length may be normalized using Equation 1, below, and the cost may be calculated using Equation 2, below, where x is the approximate gadget length, MinGadgetLength is a predefined threshold for very short gadgets that should all be treated similarly, and MaxGadgetLength is a maximum expected gadget length. Integer arithmetic may be used to determine the cost value.

$$gadgetLength(x) = \begin{cases} x - MinGadgetLength & \text{if } MinGadgetLength < x \\ 1 & \text{else} \end{cases} \quad (1)$$

$$cost(x) = \frac{MaxGadgetLength}{gadgetLength(x)} \quad (2)$$

Similarly, typical ROP exploits use a malicious stack that has been relatively recently constructed. Thus, a young age of the legacy stack indicates the possibility of malicious behavior and accordingly has a higher cost. Stack age may be determined using the time the legacy stack was first used. The computing device 100 may, for example, quadruple the cost value determined using Equation 2 if the legacy stack was first used less than a predefined amount of time in the past.

In block 826, if the cost value determined in block 824 is non-zero, the computing device 100 timestamps the cost value and adds the cost value to a cost queue. The cost queue may have a limited capacity, and adding a new cost value to the cost queue may overwrite or otherwise eliminate the oldest cost value in the cost queue. Thus, the cost queue having limited capacity may allow the computing device 100 to track cost values associated with recent stack mismatch VMexits.

In block 828, the computing device 100 determines a current total cost as a function of recent cost values stored in the cost queue. The computing device 100 may, for example, consider only cost values having a timestamp younger than a predefined maximum age. In some embodiments, in block 828, the computing device 100 may calculate the current total cost by multiplying the number of recent cost values stored in the cost queue by the total cost value of those recent cost values. Thus, the current total cost may increase when there are large numbers of relatively higher-cost stack mismatch VMexits in a short period of time.

In block 832, the computing device 100 determines whether the current total cost exceeds a predefined cost budget. The cost budget may be embodied as any predefined threshold total cost value. If the current total cost exceeds the cost budget, then a malicious ROP exploit may be active. If the current total cost does not exceed the cost budget, the method 800 branches ahead to block 836, described below. If the current total cost exceeds the cost budget, the method 800 advances to block 834.

In block 834, the computing device 100 handles a suspected ROP exploit. The computing device 100 may perform any appropriate security operation to handle the suspected ROP exploit. For example, the computing device 100 may terminate the current software thread 208. To terminate the software thread 208, the computing device 100 may inject a general protection fault into the guest virtual machine 206. Additionally or alternatively, the computing device 100 may report the suspected ROP exploit, for example by notifying a user, logging the suspected ROP exploit, or otherwise indicating that a suspected ROP exploit has occurred. In some embodiments, after detecting and handling a suspected ROP exploit, for example by injecting a general protection fault, the computing device 100 may also resume the guest software thread 208 as described below in connection with blocks 836 and 838. After handling the suspected ROP exploit, the method 800 is completed.

Referring back to block 822, if the number of consecutive stack mismatches is not greater than or equal to the threshold, the method 800 branches ahead to block 836. Additionally referring back to block 832, if the current total cost does not exceed the cost budget, the method 800 also branches ahead to block 836. In block 836, the computing device 100 pushes the top return address from the legacy stack onto the shadow stack. By pushing the top return address onto the shadow stack, the computing device 100 resolves the stack mismatch and may allow the return instruction to complete successfully. In block 838, the computing device 100 resumes the guest software thread 208. Because the top return addresses of the shadow stack and the legacy stack now match, the return instruction that previously caused the VMexit may now complete execution. After resuming the guest software thread 208, the method 800 is completed.

Figure 9:
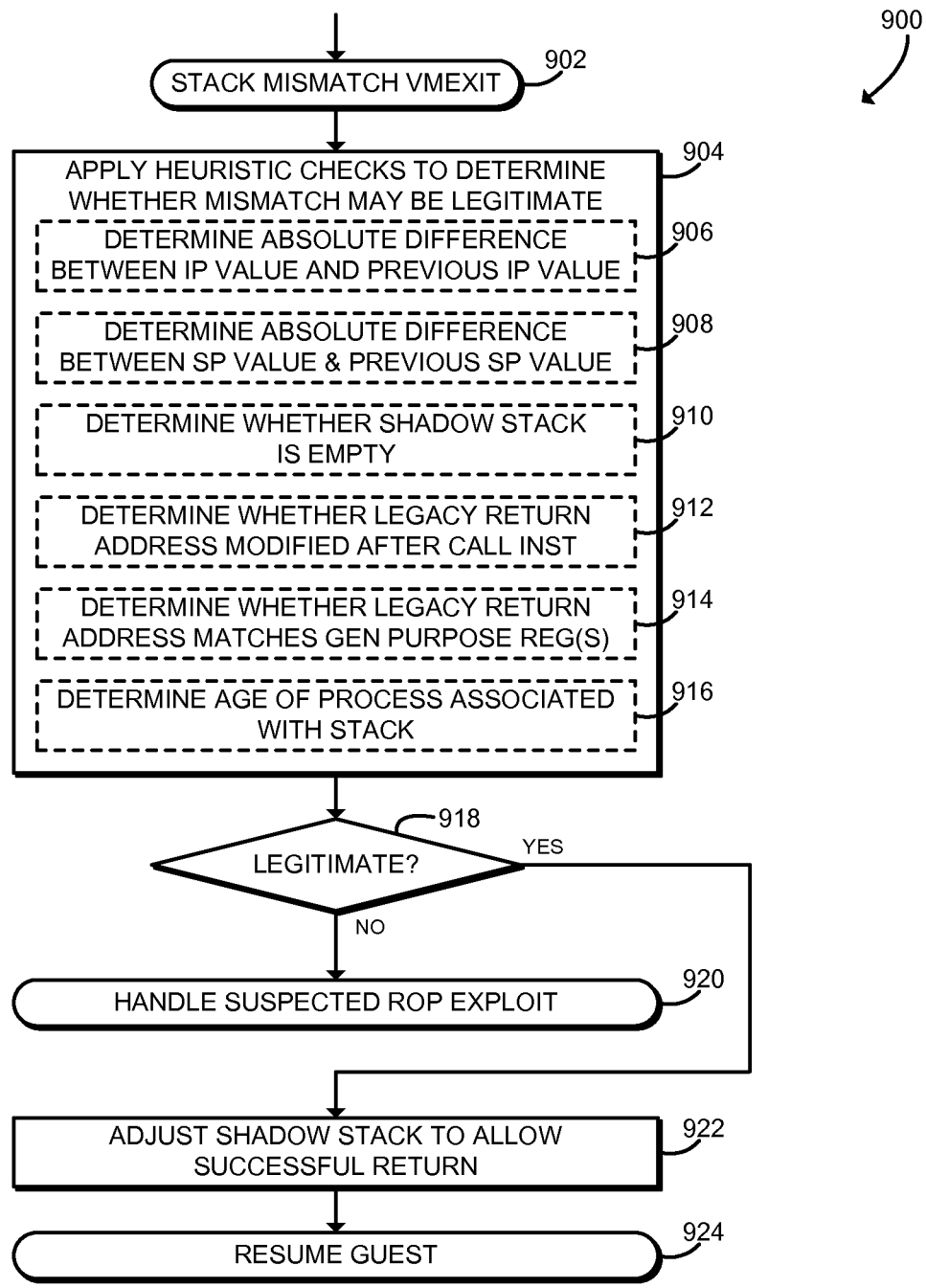
FIG. 9 is a simplified flow diagram of at least one embodiment of another method for handling a stack mismatch virtual machine exit that may be executed by the computing device of FIGS. 1 and 2.

Referring now to FIG. 9, in use, the computing device 100 may execute a method 900 for handling a stack mismatch event. The method 900 may be executed by the hypervisor 212 of the computing device 100, and the method 900 may be executed in addition to or alternatively to the method 800. The method 900 begins in block 902, in which the computing device 100 encounters a stack mismatch virtual machine exit (VMexit). As described above, the VMexit may trigger a hardware-assisted context switch from the guest virtual machine 206 to the hypervisor 212. The VMexit may be generated by the processor 120 during execution of a return instruction as described above in connection with FIG. 4. For example, the VMexit may be embodied as a stack return address mismatch VMexit as described above in connection with block 410 of FIG. 4, or a stack pointer mismatch VMexit as described above in connection with block 418 of FIG. 4.

In block 904, the computing device 100 applies one or more heuristic checks to determine whether the stack mismatch may be legitimate. As described above, both return-oriented programming (ROP) exploits and legitimate software may cause stack mismatch VMexits, and the computing device 100 may apply the heuristic checks to distinguish legitimate software from potential ROP exploits.

In block 906, the computing device 100 determines the absolute difference between the current instruction pointer value associated with the stack mismatch VMexit and the instruction pointer value of the previous stack mismatch VMexit (also known as the IP spread). Because ROP gadgets are typically selected from widely scattered locations in memory, a large IP spread may indicate that an ROP exploit is active.

In block 908, the computing device 100 determines the absolute difference between the current legacy stack pointer value associated with the stack mismatch VMexit and the legacy stack pointer value of the previous stack mismatch VMexit (also known as the SP spread). ROP exploits may typically use an ROP chain including several return addresses tightly packed on the legacy stack. Thus a small SP spread may indicate that an ROP exploit is active. Additionally or alternatively, in some embodiments a cost value may be added to the cost queue, as described above in connection with block 826 of FIG. 8, only if the SP spread is less than a predetermined threshold value.

In block 910, the computing device 100 may determine whether the shadow stack is empty. If the shadow stack is empty, that may indicate that an ROP exploit has constructed a malicious legacy stack. In some embodiments, the computing device 100 may only determine instruction pointer spread and/or stack pointer spread as described above in connection with blocks 906, 908 if the shadow stack is empty. In some embodiments, the computing device 100 may require that the shadow stack be empty for a certain number of consecutive stack mismatch VMexits.

In block 912, the computing device 100 may determine whether the top return address of the legacy stack has been modified after being pushed on the legacy stack. Modification of the return address on the legacy stack is a form of stack corruption, and may indicate that an ROP exploit is active. The computing device 100 may determine whether the return address has been modified by, for example, determining that the legacy stack pointer value matches a legacy stack pointer value stored in the shadow stack but that the top return addresses of the shadow stack and the legacy stack do not match.

In block 914, the computing device 100 may determine whether the top return address of the legacy stack matches one or more general purpose registers of the processor 120. Some legitimate software places the top return address from the legacy stack into one or more specific general purpose registers. For example, some legitimate software places the return address into the EAX or ECX registers defined by the Intel® IA-32 architecture.

In block 916, the computing device 100 may determine the age of the software process and/or software thread 208 associated with the legacy stack. The computing device 100 may determine the process age, for example, using introspection of an operating system of the guest virtual machine 206. Process initialization and other activity of young processes may cause a relatively high number of unusual stack mismatch events. Thus, a younger process age may indicate that the stack mismatch VMexit is more likely legitimate.

In block 918, the computing device 100 determines whether the VMexit is likely legitimate or not. The computing device 100 may use any weighting scheme or other formula applied to the heuristic checks described above in connection with block 904 to determine whether the VMexit is legitimate. If the VMexit is likely legitimate, the method 900 branches ahead to block 922. If the VMexit is likely not legitimate, the method 900 advances to block 920.

In block 920, the computing device 100 handles a suspected ROP exploit. As described above, the computing device 100 may perform any appropriate security operation to handle the suspected ROP exploit. For example, the computing device 100 may terminate the current software thread 208. To terminate the software thread 208, the computing device 100 may inject a general protection fault into the guest virtual machine 206. Additionally or alternatively, the computing device 100 may report the suspected ROP exploit, for example by notifying a user, logging the suspected ROP exploit, or otherwise indicating that a suspected ROP exploit has occurred. After handling the suspected ROP exploit, the method 900 is completed.

Referring back to block 918, if the VMexit is likely legitimate, the method 900 branches ahead to block 922, in which the computing device 100 adjusts the shadow stack to allow a successful return instruction. The computing device 100 may, for example, push the top return address from the legacy stack onto the shadow stack to resolve the stack mismatch, which may allow the return instruction to complete successfully. In block 924, the computing device 100 resumes the guest software thread 208. Because the top return addresses of the shadow stack and the legacy stack now match, the return instruction that previously caused the VMexit may now complete execution. After resuming the guest software thread 208, the method 900 is completed.

EXAMPLES

Illustrative examples of the technologies disclosed herein are provided below. An embodiment of the technologies may include any one or more, and any combination of, the examples described below.

Example 1 includes a computing device for shadow stack support for legacy guests, the computing device comprising a processor comprising a call module to execute a call instruction in stack monitoring mode, wherein to execute the call instruction comprises to determine whether a legacy stack pointer of the computing device is within a stack bounds of the computing device; generate a virtual machine exit to a stack out-of-bounds handler in response to a determination that the legacy stack pointer is not within the stack bounds; push a return address onto a legacy stack stored in a first memory region of the computing device in response to a determination that the legacy stack pointer is within the stack bounds; and push the return address onto a shadow stack stored in a second memory region of the computing device in response to the determination that the legacy stack pointer is within the stack bounds, wherein the second memory region is isolated from the first memory region.

Example 2 includes the subject matter of Example 1, and wherein the processor further comprises a return module to execute a return instruction in stack monitoring mode, wherein to execute the return instruction comprises to determine whether a top return address of the legacy stack matches a top return address of the shadow stack; generate a virtual machine exit to a stack mismatch handler in response to a determination that the top return address of the legacy stack does not match the top return address of the shadow stack; pop the top return address from the shadow stack in response to a determination that the top return address of the legacy stack matches the top return address of the shadow stack; and pop the top return address from the legacy stack in response to the determination that the top return address of the legacy stack matches the top return address of the shadow stack.

Example 3 includes the subject matter of any of Examples 1 and 2, and wherein to execute the call instruction further comprises to push a value of the legacy stack pointer onto the shadow stack in response to the determination that the legacy stack pointer is within the stack bounds; and to execute the return instruction further comprises to pop the value of the legacy stack pointer from the shadow stack in response to the determination that the top return address of the legacy stack matches the top return address of the shadow stack.

Example 4 includes the subject matter of any of Examples 1-3, and wherein to execute the return instruction further comprises to determine whether the legacy stack pointer matches a top value of the legacy stack pointer of the shadow stack; and generate a virtual machine exit to a stack pointer mismatch handler in response to a determination that the legacy stack pointer does not match the top value of the legacy stack pointer of the shadow stack.

Example 5 includes the subject matter of any of Examples 1-4, and further including a mismatch module established by a hypervisor of the computing device to execute the stack mismatch handler in response to generation of the virtual machine exit.

Example 6 includes the subject matter of any of Examples 1-5, and wherein to execute the stack mismatch handler comprises to determine whether the stack mismatch is legitimate by applying a heuristic check; handle a suspected return-oriented-programming exploit in response to a determination that the stack mismatch is not legitimate; and resume a guest process in response to a determination that the stack mismatch is legitimate.

Example 7 includes the subject matter of any of Examples 1-6, and wherein to handle the suspected return-oriented-programming exploit comprises to terminate the guest process.

Example 8 includes the subject matter of any of Examples 1-7, and wherein to handle the suspected return-oriented-programming exploit comprises to report the suspected return-oriented-programming exploit.

Example 9 includes the subject matter of any of Examples 1-8, and wherein to determine whether the stack mismatch is legitimate comprises to determine whether a part of the shadow stack may be skipped to match the legacy stack; skip the part of the shadow stack in response to a determination that the part of the shadow stack may be skipped; and resume the guest process in response to skipping of the part of the shadow stack.

Example 10 includes the subject matter of any of Examples 1-9, and wherein to determine whether the part of the shadow stack may be skipped comprises to determine a next legacy stack pointer value as a function of the legacy stack pointer; determine whether a top legacy stack pointer value of the shadow stack is less than the next legacy stack pointer value; and determine whether the top return address of the legacy stack is found at a higher memory address in the shadow stack in response to a determination that the top legacy stack pointer value of the shadow stack is less than the next legacy stack pointer value; wherein to determine that the part of the shadow stack may skipped comprises to determine that the top return address of the legacy stack is found at the higher memory address in the shadow stack.

Example 11 includes the subject matter of any of Examples 1-10, and wherein to skip the part of the shadow stack comprises to pop the shadow stack in response to a determination that the top return address of the legacy stack is found at the higher memory address until the top return address of the legacy stack equals the top return address of the shadow stack.

Example 12 includes the subject matter of any of Examples 1-11, and wherein to determine that the part of the shadow stack may skipped further comprises to determine that a legacy stack pointer value of the shadow stack associated with the top return address of the legacy stack found in the shadow stack is less than or equal to the next legacy stack pointer value.

Example 13 includes the subject matter of any of Examples 1-12, and wherein to determine whether the stack mismatch is legitimate comprises to determine whether a part of the shadow stack may be skipped to match the legacy stack; determine, in response to a determination that the part of the shadow stack may not be skipped, whether a number of consecutive stack mismatches that were not skipped has a predefined relationship to a threshold number of consecutive stack mismatches; calculate a cost value as a function of a gadget length and a stack age of the legacy stack in response to a determination that the number of consecutive stack mismatches that were not skipped has the predefined relationship to the threshold number of consecutive stack mismatches; determine whether the cost value has a predefined relationship to a threshold total cost; and handle the suspected return-oriented-programming exploit in response to a determination that the cost value has the predefined relationship to a threshold total cost.

Example 14 includes the subject matter of any of Examples 1-13, and wherein to calculate the cost value further comprises to add the cost value and an associated timestamp to a fixed-length cost queue in response to a determination that the cost value is nonzero; and determine a current total cost as a function of recent entries in the fixed-length cost queue; wherein to determine whether the cost value has the predefined relationship to the threshold total cost comprises to determine whether the current total cost has the predefined relationship to the threshold total cost.

Example 15 includes the subject matter of any of Examples 1-14, and wherein to calculate the cost value comprises to determine the gadget length as a current instruction pointer value minus a previous return destination value.

Example 16 includes the subject matter of any of Examples 1-15, and wherein each of the recent entries has an associated timestamp with a predefined relationship to a maximum age.

Example 17 includes the subject matter of any of Examples 1-16, and wherein to determine the total current cost comprises to multiply a number of the recent entries in the cost queue times a total cost of the recent entries in the cost queue.

Example 18 includes the subject matter of any of Examples 1-17, and wherein to execute the stack mismatch handler further comprises to push the return address of the legacy stack onto the shadow stack in response to a determination that the cost value does not have the predefined relationship to the threshold total cost or a determination that the number of consecutive stack mismatches that were not skipped does not have the predefined relationship to the threshold number of consecutive stack mismatches; and resume the guest process in response to pushing of the return address of the legacy stack onto the shadow stack.

Example 19 includes the subject matter of any of Examples 1-18, and wherein to resume the guest process comprises to retry the return instruction in monitored mode.

Example 20 includes the subject matter of any of Examples 1-19, and wherein to determine whether the stack mismatch is legitimate comprises to determine a difference between an instruction pointer value of the computing device and a saved instruction pointer value of the device corresponding to a previous stack mismatch virtual machine exit.

Example 21 includes the subject matter of any of Examples 1-20, and wherein to determine whether the stack mismatch is legitimate comprises to determine a difference between a stack pointer value of the computing device and a saved stack pointer value of the device corresponding to a previous stack mismatch virtual machine exit.

Example 22 includes the subject matter of any of Examples 1-21, and wherein to determine whether the stack mismatch is legitimate comprises to determine whether the shadow stack is empty.

Example 23 includes the subject matter of any of Examples 1-22, and wherein to determine whether the stack mismatch is legitimate comprises to determine whether the top return address of the legacy stack was modified after executing the call instruction.

Example 24 includes the subject matter of any of Examples 1-23, and wherein to determine whether the stack mismatch is legitimate comprises to determine whether a general purpose register of the computing device includes the top return address of the legacy stack.

Example 25 includes the subject matter of any of Examples 1-24, and wherein to determine whether the stack mismatch is legitimate comprises to determine whether a process age associated with the legacy stack has a predefined relationship to a threshold process age.

Example 26 includes the subject matter of any of Examples 1-25, and further including an out-of-bounds module established by a hypervisor of the computing device to execute the stack out-of-bounds handler in response to generation of the virtual machine exit.

Example 27 includes the subject matter of any of Examples 1-26, and wherein to execute the stack out-of-bounds handler comprises to determine a next legacy stack pointer value as a function of the stack out-of-bounds virtual machine exit; determine a maximum stack growth amount without a stack out-of-bounds virtual machine exit associated with the next legacy stack pointer value; allocate shadow stack memory as a function of the maximum stack growth amount, wherein the shadow stack memory is stored in the second memory region of the computing device; and update the stack bounds of the computing device to allow the next legacy stack pointer value.

Example 28 includes the subject matter of any of Examples 1-27, and wherein to execute the stack out-of-bounds handler further comprises to find a lowest legacy stack with a bottom greater than the next legacy stack pointer value; determine whether the next legacy stack pointer value is within the lowest legacy stack or within a predetermined distance from the top of the lowest legacy stack; identify a stack record associated with the lowest legacy stack in response to a determination that the next legacy stack pointer value is within the lowest legacy stack or within the predetermined distance from the top of the lowest legacy stack; create a stack record in response to a determination that the next legacy stack pointer value is not within the lowest legacy stack or within the predetermined distance from the top of the lowest legacy stack; and update the stack record to encompass the next legacy stack pointer value in response to identification of the stack record or creation of the stack record.

Example 29 includes a method for shadow stack support for legacy guests, the method comprising executing, by a call module of a processor of a computing device, a call instruction in stack monitoring mode, wherein executing the call instruction comprises determining, by the call module, whether a legacy stack pointer of the computing device is within a stack bounds of the computing device; generating, by the call module, a virtual machine exit to a stack out-of-bounds handler in response to determining the legacy stack pointer is not within the stack bounds; pushing, by the call module, a return address onto a legacy stack stored in a first memory region of the computing device in response to determining the legacy stack pointer is within the stack bounds; and pushing, by the call module, the return address onto a shadow stack stored in a second memory region of the computing device in response to determining the legacy stack pointer is within the stack bounds, wherein the second memory region is isolated from the first memory region.

Example 30 includes the subject matter of Example 29, and further including executing, by a return module of the processor of the computing device, a return instruction in stack monitoring mode, wherein executing the return instruction comprises determining, by the return module, whether a top return address of the legacy stack matches a top return address of the shadow stack; generating, by the return module, a virtual machine exit to a stack mismatch handler in response to determining the top return address of the legacy stack does not match the top return address of the shadow stack; popping, by the return module, the top return address from the shadow stack in response to determining the top return address of the legacy stack matches the top return address of the shadow stack; and popping, by the return module, the top return address from the legacy stack in response to determining the top return address of the legacy stack matches the top return address of the shadow stack.

Example 31 includes the subject matter of any of Examples 29 and 30, and wherein executing the call instruction further comprises pushing, by the call module, a value of the legacy stack pointer onto the shadow stack in response to determining the legacy stack pointer is within the stack bounds; and executing the return instruction further comprises popping, by the return module, the value of the legacy stack pointer from the shadow stack in response to determining the top return address of the legacy stack matches the top return address of the shadow stack.

Example 32 includes the subject matter of any of Examples 29-31, and wherein executing the return instruction further comprises determining, by the return module, whether the legacy stack pointer matches a top value of the legacy stack pointer of the shadow stack; and generating, by the return module, a virtual machine exit to a stack pointer mismatch handler in response to determining the legacy stack pointer does not match the top value of the legacy stack pointer of the shadow stack.

Example 33 includes the subject matter of any of Examples 29-32, and further including executing, by the computing device, the stack mismatch handler in response to generating the virtual machine exit, wherein the stack mismatch handler is established by a hypervisor of the computing device.

Example 34 includes the subject matter of any of Examples 29-33, and wherein executing the stack mismatch handler comprises determining whether the stack mismatch is legitimate by applying a heuristic check; handling a suspected return-oriented-programming exploit in response to determining the stack mismatch is not legitimate; and resuming a guest process in response to determining the stack mismatch is legitimate.

Example 35 includes the subject matter of any of Examples 29-34, and wherein handling the suspected return-oriented-programming exploit comprises terminating the guest process.

Example 36 includes the subject matter of any of Examples 29-35, and wherein handling the suspected return-oriented-programming exploit comprises reporting the suspected return-oriented-programming exploit.

Example 37 includes the subject matter of any of Examples 29-36, and wherein determining whether the stack mismatch is legitimate comprises determining whether a part of the shadow stack may be skipped to match the legacy stack; skipping the part of the shadow stack in response to determining the part of the shadow stack may be skipped; and resuming the guest process in response to skipping the part of the shadow stack.

Example 38 includes the subject matter of any of Examples 29-37, and wherein determining whether the part of the shadow stack may be skipped comprises determining a next legacy stack pointer value as a function of the legacy stack pointer; determining whether a top legacy stack pointer value of the shadow stack is less than the next legacy stack pointer value; and determining whether the top return address of the legacy stack is found at a higher memory address in the shadow stack in response to determining the top legacy stack pointer value of the shadow stack is less than the next legacy stack pointer value; wherein determining that the part of the shadow stack may skipped comprises determining that the top return address of the legacy stack is found at the higher memory address in the shadow stack.

Example 39 includes the subject matter of any of Examples 29-38, and wherein skipping the part of the shadow stack comprises popping the shadow stack in response to determining the top return address of the legacy stack is found at the higher memory address until the top return address of the legacy stack equals the top return address of the shadow stack.

Example 40 includes the subject matter of any of Examples 29-39, and wherein determining that the part of the shadow stack may skipped further comprises determining that a legacy stack pointer value of the shadow stack associated with the top return address of the legacy stack found in the shadow stack is less than or equal to the next legacy stack pointer value.

Example 41 includes the subject matter of any of Examples 29-40, and wherein determining whether the stack mismatch is legitimate comprises determining whether a part of the shadow stack may be skipped to match the legacy stack; determining, in response to determining the part of the shadow stack may not be skipped, whether a number of consecutive stack mismatches that were not skipped has a predefined relationship to a threshold number of consecutive stack mismatches; calculating a cost value as a function of a gadget length and a stack age of the legacy stack in response to determining the number of consecutive stack mismatches that were not skipped has the predefined relationship to the threshold number of consecutive stack mismatches; determining whether the cost value has a predefined relationship to a threshold total cost; and handling a suspected return-oriented-programming exploit in response to determining the cost value has the predefined relationship to a threshold total cost.

Example 42 includes the subject matter of any of Examples 29-41, and wherein calculating the cost value further comprises adding the cost value and an associated timestamp to a fixed-length cost queue in response to determining the cost value is nonzero; and determining a current total cost as a function of recent entries in the fixed-length cost queue; wherein determining whether the cost value has the predefined relationship to the threshold total cost comprises determining whether the current total cost has the predefined relationship to the threshold total cost.

Example 43 includes the subject matter of any of Examples 29-42, and wherein calculating the cost value comprises determining the gadget length as a current instruction pointer value minus a previous return destination value.

Example 44 includes the subject matter of any of Examples 29-43, and wherein each of the recent entries has an associated timestamp having a predefined relationship to a maximum age.

Example 45 includes the subject matter of any of Examples 29-44, and wherein determining the total current cost comprises multiplying a number of the recent entries in the cost queue times a total cost of the recent entries in the cost queue.

Example 46 includes the subject matter of any of Examples 29-45, and wherein executing the stack mismatch handler further comprises pushing the return address of the legacy stack onto the shadow stack in response to determining the cost value does not have the predefined relationship to the threshold total cost or determining the number of consecutive stack mismatches that were not skipped does not have the predefined relationship to the threshold number of consecutive stack mismatches; and resuming the guest process in response to pushing the return address of the legacy stack onto the shadow stack.

Example 47 includes the subject matter of any of Examples 29-46, and wherein resuming the guest process comprises retrying the return instruction in monitored mode.

Example 48 includes the subject matter of any of Examples 29-47, and wherein determining whether the stack mismatch is legitimate comprises determining a difference between an instruction pointer value of the computing device and a saved instruction pointer value of the device corresponding to a previous stack mismatch virtual machine exit.

Example 49 includes the subject matter of any of Examples 29-48, and wherein determining whether the stack mismatch is legitimate comprises determining a difference between a stack pointer value of the computing device and a saved stack pointer value of the device corresponding to a previous stack mismatch virtual machine exit.

Example 50 includes the subject matter of any of Examples 29-49, and wherein determining whether the stack mismatch is legitimate comprises determining whether the shadow stack is empty.

Example 51 includes the subject matter of any of Examples 29-50, and wherein determining whether the stack mismatch is legitimate comprises determining whether the top return address of the legacy stack was modified after executing the call instruction.

Example 52 includes the subject matter of any of Examples 29-51, and wherein determining whether the stack mismatch is legitimate comprises determining whether a general purpose register of the computing device includes the top return address of the legacy stack.

Example 53 includes the subject matter of any of Examples 29-52, and wherein determining whether the stack mismatch is legitimate comprises determining whether a process age associated with the legacy stack has a predefined relationship to a threshold process age.

Example 54 includes the subject matter of any of Examples 29-53, and further including executing, by the computing device, the stack out-of-bounds handler in response to generating the virtual machine exit, wherein the stack out-of-bounds handler is established by a hypervisor of the computing device.

Example 55 includes the subject matter of any of Examples 29-54, and wherein executing the stack out-of-bounds handler comprises determining a next legacy stack pointer value as a function of the stack out-of-bounds virtual machine exit; determining a maximum stack growth amount without a stack out-of-bounds virtual machine exit associated with the next legacy stack pointer value; allocating shadow stack memory as a function of the maximum stack growth amount, wherein the shadow stack memory is stored in the second memory region of the computing device; and updating the stack bounds of the computing device to allow the next legacy stack pointer value.

Example 56 includes the subject matter of any of Examples 29-55, and wherein executing the stack out-of-bounds handler further comprises finding a lowest legacy stack having a bottom greater than the next legacy stack pointer value; determining whether the next legacy stack pointer value is within the lowest legacy stack or within a predetermined distance from the top of the lowest legacy stack; identifying a stack record associated with the lowest legacy stack in response to determining that the next legacy stack pointer value is within the lowest legacy stack or within the predetermined distance from the top of the lowest legacy stack; creating a stack record in response to determining that the next legacy stack pointer value is not within the lowest legacy stack or within the predetermined distance from the top of the lowest legacy stack; and updating the stack record to encompass the next legacy stack pointer value in response to identifying the stack record or creating the stack record.

Example 57 includes a computing device comprising a processor; and a memory having stored therein a plurality of instructions that when executed by the processor cause the computing device to perform the method of any of Examples 29-56.

Example 58 includes one or more machine readable storage media comprising a plurality of instructions stored thereon that in response to being executed result in a computing device performing the method of any of Examples 29-56.

Example 59 includes a computing device comprising means for performing the method of any of Examples 29-56.

Example 60 includes a computing device for shadow stack support for legacy guests, the computing device comprising means for executing, by a call module of a processor of the computing device, a call instruction in stack monitoring mode, wherein the means for executing the call instruction comprises means for determining whether a legacy stack pointer of the computing device is within a stack bounds of the computing device; means for generating a virtual machine exit to a stack out-of-bounds handler in response to determining the legacy stack pointer is not within the stack bounds; means for pushing a return address onto a legacy stack stored in a first memory region of the computing device in response to determining the legacy stack pointer is within the stack bounds; and means for pushing the return address onto a shadow stack stored in a second memory region of the computing device in response to determining the legacy stack pointer is within the stack bounds, wherein the second memory region is isolated from the first memory region.

Example 61 includes the subject matter of Example 60, and further including means for executing, by a return module of the processor of the computing device, a return instruction in stack monitoring mode, wherein the means for executing the return instruction comprises means for determining whether a top return address of the legacy stack matches a top return address of the shadow stack; means for generating a virtual machine exit to a stack mismatch handler in response to determining the top return address of the legacy stack does not match the top return address of the shadow stack; means for popping the top return address from the shadow stack in response to determining the top return address of the legacy stack matches the top return address of the shadow stack; and means for popping the top return address from the legacy stack in response to determining the top return address of the legacy stack matches the top return address of the shadow stack.

Example 62 includes the subject matter of any of Examples 60 and 61, and wherein the means for executing the call instruction further comprises means for pushing, by the call module, a value of the legacy stack pointer onto the shadow stack in response to determining the legacy stack pointer is within the stack bounds; and the means for executing the return instruction further comprises means for popping, by the return module, the value of the legacy stack pointer from the shadow stack in response to determining the top return address of the legacy stack matches the top return address of the shadow stack.

Example 63 includes the subject matter of any of Examples 60-62, and wherein the means for executing the return instruction further comprises means for determining, by the return module, whether the legacy stack pointer matches a top value of the legacy stack pointer of the shadow stack; and means for generating, by the return module, a virtual machine exit to a stack pointer mismatch handler in response to determining the legacy stack pointer does not match the top value of the legacy stack pointer of the shadow stack.

Example 64 includes the subject matter of any of Examples 60-63, and further including means for executing the stack mismatch handler in response to generating the virtual machine exit, wherein the stack mismatch handler is established by a hypervisor of the computing device.

Example 65 includes the subject matter of any of Examples 60-64, and wherein the means for executing the stack mismatch handler comprises means for determining whether the stack mismatch is legitimate by applying a heuristic check; means for handling a suspected return-oriented-programming exploit in response to determining the stack mismatch is not legitimate; and means for resuming a guest process in response to determining the stack mismatch is legitimate.

Example 66 includes the subject matter of any of Examples 60-65, and wherein the means for handling the suspected return-oriented-programming exploit comprises means for terminating the guest process.

Example 67 includes the subject matter of any of Examples 60-66, and wherein the means for handling the suspected return-oriented-programming exploit comprises means for reporting the suspected return-oriented-programming exploit.

Example 68 includes the subject matter of any of Examples 60-67, and wherein the means for determining whether the stack mismatch is legitimate comprises means for determining whether a part of the shadow stack may be skipped to match the legacy stack; means for skipping the part of the shadow stack in response to determining the part of the shadow stack may be skipped; and means for resuming the guest process in response to skipping the part of the shadow stack.

Example 69 includes the subject matter of any of Examples 60-68, and wherein the means for determining whether the part of the shadow stack may be skipped comprises means for determining a next legacy stack pointer value as a function of the legacy stack pointer; means for determining whether a top legacy stack pointer value of the shadow stack is less than the next legacy stack pointer value; and means for determining whether the top return address of the legacy stack is found at a higher memory address in the shadow stack in response to determining the top legacy stack pointer value of the shadow stack is less than the next legacy stack pointer value; wherein the means for determining that the part of the shadow stack may skipped comprises means for determining that the top return address of the legacy stack is found at the higher memory address in the shadow stack.

Example 70 includes the subject matter of any of Examples 60-69, and wherein the means for skipping the part of the shadow stack comprises means for popping the shadow stack in response to determining the top return address of the legacy stack is found at the higher memory address until the top return address of the legacy stack equals the top return address of the shadow stack.

Example 71 includes the subject matter of any of Examples 60-70, and wherein the means for determining that the part of the shadow stack may skipped further comprises means for determining that a legacy stack pointer value of the shadow stack associated with the top return address of the legacy stack found in the shadow stack is less than or equal to the next legacy stack pointer value.

Example 72 includes the subject matter of any of Examples 60-71, and wherein the means for determining whether the stack mismatch is legitimate comprises means for determining whether a part of the shadow stack may be skipped to match the legacy stack; means for determining, in response to determining the part of the shadow stack may not be skipped, whether a number of consecutive stack mismatches that were not skipped has a predefined relationship to a threshold number of consecutive stack mismatches; means for calculating a cost value as a function of a gadget length and a stack age of the legacy stack in response to determining the number of consecutive stack mismatches that were not skipped has the predefined relationship to the threshold number of consecutive stack mismatches; means for determining whether the cost value has a predefined relationship to a threshold total cost; and means for handling a suspected return-oriented-programming exploit in response to determining the cost value has the predefined relationship to a threshold total cost.

Example 73 includes the subject matter of any of Examples 60-72, and wherein the means for calculating the cost value further comprises means for adding the cost value and an associated timestamp to a fixed-length cost queue in response to determining the cost value is nonzero; and means for determining a current total cost as a function of recent entries in the fixed-length cost queue; wherein the means for determining whether the cost value has the predefined relationship to the threshold total cost comprises means for determining whether the current total cost has the predefined relationship to the threshold total cost.

Example 74 includes the subject matter of any of Examples 60-73, and wherein the means for calculating the cost value comprises means for determining the gadget length as a current instruction pointer value minus a previous return destination value.

Example 75 includes the subject matter of any of Examples 60-74, and wherein each of the recent entries has an associated timestamp having a predefined relationship to a maximum age.

Example 76 includes the subject matter of any of Examples 60-75, and wherein the means for determining the total current cost comprises means for multiplying a number of the recent entries in the cost queue times a total cost of the recent entries in the cost queue.

Example 77 includes the subject matter of any of Examples 60-76, and wherein the means for executing the stack mismatch handler further comprises means for pushing the return address of the legacy stack onto the shadow stack in response to determining the cost value does not have the predefined relationship to the threshold total cost or determining the number of consecutive stack mismatches that were not skipped does not have the predefined relationship to the threshold number of consecutive stack mismatches; and means for resuming the guest process in response to pushing the return address of the legacy stack onto the shadow stack.

Example 78 includes the subject matter of any of Examples 60-77, and wherein the means for resuming the guest process comprises means for retrying the return instruction in monitored mode.

Example 79 includes the subject matter of any of Examples 60-78, and wherein the means for determining whether the stack mismatch is legitimate comprises means for determining a difference between an instruction pointer value of the computing device and a saved instruction pointer value of the device corresponding to a previous stack mismatch virtual machine exit.

Example 80 includes the subject matter of any of Examples 60-79, and wherein the means for determining whether the stack mismatch is legitimate comprises means for determining a difference between a stack pointer value of the computing device and a saved stack pointer value of the device corresponding to a previous stack mismatch virtual machine exit.

Example 81 includes the subject matter of any of Examples 60-80, and wherein the means for determining whether the stack mismatch is legitimate comprises means for determining whether the shadow stack is empty.

Example 82 includes the subject matter of any of Examples 60-81, and wherein the means for determining whether the stack mismatch is legitimate comprises means for determining whether the top return address of the legacy stack was modified after executing the call instruction.

Example 83 includes the subject matter of any of Examples 60-82, and wherein the means for determining whether the stack mismatch is legitimate comprises means for determining whether a general purpose register of the computing device includes the top return address of the legacy stack.

Example 84 includes the subject matter of any of Examples 60-83, and wherein the means for determining whether the stack mismatch is legitimate comprises means for determining whether a process age associated with the legacy stack has a predefined relationship to a threshold process age.

Example 85 includes the subject matter of any of Examples 60-84, and further including means for executing the stack out-of-bounds handler in response to generating the virtual machine exit, wherein the stack out-of-bounds handler is established by a hypervisor of the computing device.

Example 86 includes the subject matter of any of Examples 60-85, and wherein the means for executing the stack out-of-bounds handler comprises means for determining a next legacy stack pointer value as a function of the stack out-of-bounds virtual machine exit; means for determining a maximum stack growth amount without a stack out-of-bounds virtual machine exit associated with the next legacy stack pointer value; means for allocating shadow stack memory as a function of the maximum stack growth amount, wherein the shadow stack memory is stored in the second memory region of the computing device; and means for updating the stack bounds of the computing device to allow the next legacy stack pointer value.

Example 87 includes the subject matter of any of Examples 60-86, and wherein the means for executing the stack out-of-bounds handler further comprises means for finding a lowest legacy stack having a bottom greater than the next legacy stack pointer value; means for determining whether the next legacy stack pointer value is within the lowest legacy stack or within a predetermined distance from the top of the lowest legacy stack; means for identifying a stack record associated with the lowest legacy stack in response to determining that the next legacy stack pointer value is within the lowest legacy stack or within the predetermined distance from the top of the lowest legacy stack; means for creating a stack record in response to determining that the next legacy stack pointer value is not within the lowest legacy stack or within the predetermined distance from the top of the lowest legacy stack; and means for updating the stack record to encompass the next legacy stack pointer value in response to identifying the stack record or creating the stack record.

The invention claimed is:

1. A method for shadow stack support for legacy guests, the method comprising:
    executing, by a call module of a processor of a computing device, a call instruction in stack monitoring mode, wherein executing the call instruction comprises:
        determining, by the call module, whether a legacy stack pointer of the computing device is within a stack bounds of the computing device;
        generating, by the call module, a virtual machine exit to a stack out-of-bounds handler in response to determining the legacy stack pointer is not within the stack bounds;
        pushing, by the call module, a return address onto a legacy stack stored in a first memory region of the computing device in response to determining the legacy stack pointer is within the stack bounds; and
        pushing, by the call module, the return address onto a shadow stack stored in a second memory region of the computing device in response to determining the legacy stack pointer is within the stack bounds, wherein the second memory region is isolated from the first memory region; and
    executing, by a return module of the processor of the computing device, a return instruction in stack monitoring mode, wherein executing the return instruction comprises:
        determining, by the return module, whether a to return address of the legacy stack matches a to return address of the shadow stack;
        generating, by the return module, a virtual machine exit to a stack mismatch handler in response to determining the top return address of the legacy stack does not match the top return address of the shadow stack;
        popping, by the return module, the top return address from the shadow stack in response to determining the top return address of the legacy stack matches the top return address of the shadow stack; and
        popping, by the return module, the top return address from the legacy stack in response to determining the top return address of the legacy stack matches the top return address of the shadow stack.

2. The method of claim 1, further comprising executing, by the computing device, the stack mismatch handler in response to generating the virtual machine exit, wherein the stack mismatch handler is established by a hypervisor of the computing device, and wherein executing the stack mismatch handler comprises:
    determining whether the stack mismatch is legitimate by applying a heuristic check;
    handling a suspected return-oriented-programming exploit in response to determining the stack mismatch is not legitimate; and
    resuming a guest process in response to determining the stack mismatch is legitimate.

3. The method of claim 2, wherein determining whether the stack mismatch is legitimate comprises:
    determining whether a part of the shadow stack may be skipped to match the legacy stack;
    determining, in response to determining the part of the shadow stack may not be skipped, whether a number of consecutive stack mismatches that were not skipped has a predefined relationship to a threshold number of consecutive stack mismatches;
    calculating a cost value as a function of a gadget length and a stack age of the legacy stack in response to determining the number of consecutive stack mismatches that were not skipped has the predefined relationship to the threshold number of consecutive stack mismatches;
    determining whether the cost value has a predefined relationship to a threshold total cost; and
    handling a suspected return-oriented-programming exploit in response to determining the cost value has the predefined relationship to a threshold total cost.

4. The method of claim 3, wherein executing the stack mismatch handler further comprises:
  pushing the return address of the legacy stack onto the shadow stack in response to determining the cost value does not have the predefined relationship to the threshold total cost or determining the number of consecutive stack mismatches that were not skipped does not have the predefined relationship to the threshold number of consecutive stack mismatches; and
  resuming the guest process in response to pushing the return address of the legacy stack onto the shadow stack.

5. The method of claim 1, further comprising executing, by the computing device, the stack out-of-bounds handler in response to generating the virtual machine exit, wherein the stack out-of-bounds handler is established by a hypervisor of the computing device, and wherein executing the stack out-of-bounds handler comprises:
  determining a next legacy stack pointer value as a function of the stack out-of-bounds virtual machine exit;
  determining a maximum stack growth amount without a stack out-of-bounds virtual machine exit associated with the next legacy stack pointer value;
  allocating shadow stack memory as a function of the maximum stack growth amount, wherein the shadow stack memory is stored in the second memory region of the computing device; and
  updating the stack bounds of the computing device to allow the next legacy stack pointer value.

6. A computing device for shadow stack support for legacy guests, the computing device comprising:
  a processor comprising a call module to execute a call instruction in stack monitoring mode and a return module to execute a return instruction in stack monitoring mode,
  wherein to execute the call instruction comprises to:
    determine whether a legacy stack pointer of the computing device is within a stack bounds of the computing device;
    generate a virtual machine exit to a stack out-of-bounds handler in response to a determination that the legacy stack pointer is not within the stack bounds;
    push a return address onto a legacy stack stored in a first memory region of the computing device in response to a determination that the legacy stack pointer is within the stack bounds; and
    push the return address onto a shadow stack stored in a second memory region of the computing device in response to the determination that the legacy stack pointer is within the stack bounds, wherein the second memory region is isolated from the first memory region; and
  wherein to execute the return instruction comprises to:
    determine whether a top return address of the legacy stack matches a top return address of the shadow stack;
    generate a virtual machine exit to a stack mismatch handler in response to a determination that the top return address of the legacy stack does not match the top return address of the shadow stack;
    pop the top return address from the shadow stack in response to a determination that the top return address of the legacy stack matches the top return address of the shadow stack; and
    pop the top return address from the legacy stack in response to the determination that the top return address of the legacy stack matches the top return address of the shadow stack.

7. The computing device of claim 6, further comprising a mismatch module established by a hypervisor of the computing device to execute the stack mismatch handler in response to generation of the virtual machine exit, wherein to execute the stack mismatch handler comprises to:
  determine whether the stack mismatch is legitimate by application of a heuristic check;
  handle a suspected return-oriented-programming exploit in response to a determination that the stack mismatch is not legitimate; and
  resume a guest process in response to a determination that the stack mismatch is legitimate.

8. The computing device of claim 7, wherein to determine whether the stack mismatch is legitimate comprises to:
  determine whether a part of the shadow stack may be skipped to match the legacy stack;
  skip the part of the shadow stack in response to a determination that the part of the shadow stack may be skipped; and
  resume the guest process in response to skipping of the part of the shadow stack.

9. The computing device of claim 8, wherein to determine whether the part of the shadow stack may be skipped comprises to:
  determine a next legacy stack pointer value as a function of the legacy stack pointer;
  determine whether a top legacy stack pointer value of the shadow stack is less than the next legacy stack pointer value; and
  determine whether the top return address of the legacy stack is found at a higher memory address in the shadow stack in response to a determination that the top legacy stack pointer value of the shadow stack is less than the next legacy stack pointer value;
  wherein to determine that the part of the shadow stack may skipped comprises to determine that the top return address of the legacy stack is found at the higher memory address in the shadow stack.

10. The computing device of claim 7, wherein to determine whether the stack mismatch is legitimate comprises to:
  determine whether a part of the shadow stack may be skipped to match the legacy stack;
  determine, in response to a determination that the part of the shadow stack may not be skipped, whether a number of consecutive stack mismatches that were not skipped has a predefined relationship to a threshold number of consecutive stack mismatches;
  calculate a cost value as a function of a gadget length and a stack age of the legacy stack in response to a determination that the number of consecutive stack mismatches that were not skipped has the predefined relationship to the threshold number of consecutive stack mismatches;
  determine whether the cost value has a predefined relationship to a threshold total cost; and
  handle the suspected return-oriented-programming exploit in response to a determination that the cost value has the predefined relationship to a threshold total cost.

11. The computing device of claim 10, wherein:
  to calculate the cost value further comprises to:
    add the cost value and an associated timestamp to a fixed-length cost queue in response to a determination that the cost value is nonzero; and determine a current total cost as a function of recent entries in the fixed-length cost queue;

wherein to determine whether the cost value has the predefined relationship to the threshold total cost comprises to determine whether the current total cost has the predefined relationship to the threshold total cost.

12. The computing device of claim 11, wherein to calculate the cost value comprises to determine the gadget length as a current instruction pointer value minus a previous return destination value.

13. The computing device of claim 11, wherein to determine the total current cost comprises to multiply a number of the recent entries in the cost queue times a total cost of the recent entries in the cost queue.

14. The computing device of claim 10, wherein to execute the stack mismatch handler further comprises to:

push the return address of the legacy stack onto the shadow stack in response to a determination that the cost value does not have the predefined relationship to the threshold total cost or a determination that the number of consecutive stack mismatches that were not skipped does not have the predefined relationship to the threshold number of consecutive stack mismatches; and resume the guest process in response to pushing of the return address of the legacy stack onto the shadow stack.

15. The computing device of claim 1, further comprising an out-of-bounds module established by a hypervisor of the computing device to execute the stack out-of-bounds handler in response to generation of the virtual machine exit, wherein to execute the stack out-of-bounds handler comprises to:

determine a next legacy stack pointer value as a function of the stack out-of-bounds virtual machine exit;

determine a maximum stack growth amount without a stack out-of-bounds virtual machine exit associated with the next legacy stack pointer value;

allocate shadow stack memory as a function of the maximum stack growth amount, wherein the shadow stack memory is stored in the second memory region of the computing device; and update the stack bounds of the computing device to allow the next legacy stack pointer value.

16. The computing device of claim 15, wherein to execute the stack out-of-bounds handler further comprises to:

find a lowest legacy stack with a bottom greater than the next legacy stack pointer value;

determine whether the next legacy stack pointer value is within the lowest legacy stack or within a predetermined distance from the top of the lowest legacy stack;

identify a stack record associated with the lowest legacy stack in response to a determination that the next legacy stack pointer value is within the lowest legacy stack or within the predetermined distance from the top of the lowest legacy stack;

create a stack record in response to a determination that the next legacy stack pointer value is not within the lowest legacy stack or within the predetermined distance from the top of the lowest legacy stack; and update the stack record to encompass the next legacy stack pointer value in response to identification of the stack record or creation of the stack record.

17. One or more non-transitory computer-readable storage media comprising a plurality of instructions that in response to being executed cause a computing device to:

execute a call instruction in stack monitoring mode, wherein to execute the call instruction comprises to:

determine whether a legacy stack pointer of the computing device is within a stack bounds of the computing device;

generate a virtual machine exit to a stack out-of-bounds handler in response to determining the legacy stack pointer is not within the stack bounds;

push a return address onto a legacy stack stored in a first memory region of the computing device in response to determining the legacy stack pointer is within the stack bounds; and push the return address onto a shadow stack stored in a second memory region of the computing device in response to determining the legacy stack pointer is within the stack bounds, wherein the second memory region is isolated from the first memory region; and execute a return instruction in stack monitoring mode, wherein to execute the return instruction comprises to:

determine whether a top return address of the legacy stack matches a top return address of the shadow stack;

generate a virtual machine exit to a stack mismatch handler in response to determining the to return address of the legacy stack does not match the to return address of the shadow stack;

pop the top return address from the shadow stack in response to determining the top return address of the legacy stack matches the top return address of the shadow stack; and pop the top return address from the legacy stack in response to determining the top return address of the legacy stack matches the top return address of the shadow stack.

18. The one or more non-transitory computer-readable storage media of claim 17, further comprising a plurality of instructions that in response to being executed cause the computing device to execute the stack mismatch handler in response to generating the virtual machine exit, wherein the stack mismatch handler is established by a hypervisor of the computing device, and wherein to execute the stack mismatch handler comprises to:

determine whether the stack mismatch is legitimate by applying a heuristic check;

handle a suspected return-oriented-programming exploit in response to determining the stack mismatch is not legitimate; and resume a guest process in response to determining the stack mismatch is legitimate.

19. The one or more non-transitory computer-readable storage media of claim 18, wherein to determine whether the stack mismatch is legitimate comprises to:

determine whether a part of the shadow stack may be skipped to match the legacy stack;

determine, in response to determining the part of the shadow stack may not be skipped, whether a number of consecutive stack mismatches that were not skipped has a predefined relationship to a threshold number of consecutive stack mismatches;

calculate a cost value as a function of a gadget length and a stack age of the legacy stack in response to determining the number of consecutive stack mismatches that were not skipped has the predefined relationship to the threshold number of consecutive stack mismatches;

determine whether the cost value has a predefined relationship to a threshold total cost; and handle a suspected return-oriented-programming exploit in response to determining the cost value has the predefined relationship to a threshold total cost.

20. The one or more non-transitory computer-readable storage media of claim 19, wherein to execute the stack mismatch handler further comprises to:
   push the return address of the legacy stack onto the shadow stack in response to determining the cost value does not have the predefined relationship to the threshold total cost or determining the number of consecutive stack mismatches that were not skipped does not have the predefined relationship to the threshold number of consecutive stack mismatches; and
   resume the guest process in response to pushing the return address of the legacy stack onto the shadow stack.

21. The one or more non-transitory computer-readable storage media of claim 17, further comprising a plurality of instructions that in response to being executed cause the computing device to execute the stack out-of-bounds handler in response to generating the virtual machine exit, wherein the stack out-of-bounds handler is established by a hypervisor of the computing device, and wherein to execute the stack out-of-bounds handler comprises to:
   determine a next legacy stack pointer value as a function of the stack out-of-bounds virtual machine exit;
   determine a maximum stack growth amount without a stack out-of-bounds virtual machine exit associated with the next legacy stack pointer value;
   allocate shadow stack memory as a function of the maximum stack growth amount, wherein the shadow stack memory is stored in the second memory region of the computing device; and
   update the stack bounds of the computing device to allow the next legacy stack pointer value.

* * * * *